US012163707B2

(12) United States Patent
Miyazaki et al.

(10) Patent No.: US 12,163,707 B2
(45) Date of Patent: Dec. 10, 2024

(54) REFRIGERATION CYCLE APPARATUS AND FOUR-WAY VALVE

(71) Applicant: DAIKIN INDUSTRIES, LTD., Osaka (JP)

(72) Inventors: Takeru Miyazaki, Osaka (JP); Hiromune Matsuoka, Osaka (JP); Atsushi Yoshimi, Osaka (JP); Eiji Kumakura, Osaka (JP); Ikuhiro Iwata, Osaka (JP); Tomoatsu Minamida, Osaka (JP); Takuro Yamada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 304 days.

(21) Appl. No.: 17/707,220

(22) Filed: Mar. 29, 2022

(65) Prior Publication Data

US 2022/0221204 A1 Jul. 14, 2022

Related U.S. Application Data

(63) Continuation of application No. PCT/JP2020/036324, filed on Sep. 25, 2020.

(30) Foreign Application Priority Data

Sep. 30, 2019 (JP) .................................. 2019-180596

(51) Int. Cl.
*F25B 41/26* (2021.01)
*F16K 11/085* (2006.01)
*F25B 13/00* (2006.01)

(52) U.S. Cl.
CPC .......... *F25B 41/26* (2021.01); *F16K 11/0856* (2013.01); *F25B 13/00* (2013.01);
(Continued)

(58) Field of Classification Search
CPC ...... F16K 11/0856; F25B 13/00; F25B 41/20; F25B 41/26; F25B 41/42;
(Continued)

(56) References Cited

U.S. PATENT DOCUMENTS 6,289,931 B1* 9/2001 Sisk ........................ F25B 41/26
137/625.43
6,830,073 B2* 12/2004 Lee ..................... F15B 13/0435
251/59

(Continued)

FOREIGN PATENT DOCUMENTS

EP 2312227 A1 * 4/2011 ........... F24D 17/001
EP 2 902 727 A1 8/2015
(Continued)

OTHER PUBLICATIONS

Machine translation of EP-2312227; Retrieved Mar. 22, 2024 (Year: 2024).*

(Continued)

*Primary Examiner* — Eric S Ruppert
*Assistant Examiner* — Hans R Weiland
(74) *Attorney, Agent, or Firm* — Birch, Stewart, Kolasch & Birch, LLP

(57) ABSTRACT

In a refrigeration cycle apparatus, a switching mechanism includes a first channel and performs switching among a first, second and third connection states. In the first connection state, the refrigeration cycle apparatus repeatedly performs a first cycle in which refrigerant flows through a compressor, a first heat exchanger, a second heat exchanger, and the compressor in that order. In the second connection state, the refrigeration cycle apparatus repeatedly performs a second cycle in which refrigerant flows through the compressor, the second heat exchanger, the first heat exchanger, and the compressor in that order. In the third
(Continued)

connection state, a passage between the compressor and the first heat exchanger and a passage between the compressor and the second heat exchanger are closed, and the first channel in the refrigeration cycle apparatus provides interconnection between the first heat exchanger and the second heat exchanger.

20 Claims, 11 Drawing Sheets

(52) U.S. Cl.
CPC ............... *F25B 2313/02741* (2013.01); *F25B 2600/2501* (2013.01); *F25B 2600/2519* (2013.01)

(58) Field of Classification Search
CPC .... F25B 2313/02741; F25B 2313/0276; F25B 2600/2501; F25B 2600/2519
See application file for complete search history.

(56) References Cited

U.S. PATENT DOCUMENTS

| | | | | |
|---|---|---|---|---|
| 7,152,416 | B2* | 12/2006 | Lifson | F25B 41/26 |
| | | | | 62/196.3 |
| 2006/0230770 | A1* | 10/2006 | Kitsch | F25B 13/00 |
| | | | | 62/151 |
| 2006/0248905 | A1 | 11/2006 | Cho et al. | |
| 2008/0053141 | A1 | 3/2008 | Kim et al. | |
| 2014/0305154 | A1* | 10/2014 | Yoshioka | F16K 11/087 |
| | | | | 137/625 |
| 2016/0334151 | A1* | 11/2016 | Yu | F25B 13/00 |
| 2019/0203981 | A1* | 7/2019 | Akaiwa | F25B 47/025 |

FOREIGN PATENT DOCUMENTS

| | | | | |
|---|---|---|---|---|
| JP | 2002-018357 | A | | 1/2002 |
| JP | 2005-098607 | A | | 4/2005 |
| JP | 2006-313058 | A | | 11/2006 |
| JP | 2010-064939 | A | | 4/2010 |
| JP | 2018-123972 | A | | 8/2018 |
| WO | WO-2011048724 | A1 * | 4/2011 | .......... F16K 11/0856 |

OTHER PUBLICATIONS

Extended European Search Report for European Application No. 20873293.3, dated Feb. 3, 2023.
International Search Report (PCT/ISA/210) issued in PCT/JP2020/036324, dated Nov. 24, 2020.
Written Opinion (PCT/ISA/237) issued in PCT/JP2020/036324, dated Nov. 24, 2020.
English translation of the International Preliminary Report on Patentability and Written Opinion of the International Searching Authority for International Application No. PCT/JP2020/036324, dated Apr. 14, 2022.

* cited by examiner

REFRIGERATION CYCLE APPARATUS AND FOUR-WAY VALVE

CROSS REFERENCE TO RELATED APPLICATIONS

This application is a Continuation of PCT International Application No. PCT/JP2020/036324, filed on Sep. 25, 2020, which claims priority under 35 U.S.C. 119(a) to Patent Application No. 2019-180596, filed in Japan on Sep. 30, 2019, all of which are hereby expressly incorporated by reference into the present application.

TECHNICAL FIELD

A refrigeration cycle apparatus including a switching mechanism that redirects a flow of refrigerant is herein disclosed. A four-way valve that redirects a flow of refrigerant is also herein disclosed.

BACKGROUND ART

Some refrigeration cycle apparatuses put into practical use are configured such that a four-way valve redirects a flow of refrigerant. For example, a technique disclosed in PTL 1 (Japanese Unexamined Patent Application Publication No. 2018-123972) concerns a rotary-type four-way switching valve (four-way valve) for redirecting a flow of refrigerant in a refrigeration cycle apparatus or, more specifically, an air conditioning apparatus. The air conditioning apparatus described in PTL 1 is configured such that the four-way valve redirects a flow of refrigerant to enable switching between cooling operation and heating operation.

SUMMARY

According to one aspect, a refrigeration cycle apparatus includes a compressor, a first heat exchanger, a second heat exchanger, and a switching mechanism. The compressor sucks in refrigerant, compresses the refrigerant, and then discharges the refrigerant. The first heat exchanger functions as a radiator in a first cycle and functions as an evaporator in a second cycle. The second heat exchanger functions as an evaporator in the first cycle and functions as a radiator in the second cycle. The switching mechanism includes a first channel and performs switching among a first connection state, a second connection state, and a third connection state. In the first connection state, the refrigeration cycle apparatus repeatedly performs the first cycle in which refrigerant flows through the compressor, the first heat exchanger, the second heat exchanger, and the compressor in that order. In the second connection state, the refrigeration cycle apparatus repeatedly performs the second cycle in which refrigerant flows through the compressor, the second heat exchanger, the first heat exchanger, and the compressor in that order. In the third connection state, a passage between the compressor and the first heat exchanger and a passage between the compressor and the second heat exchanger are closed, and the first channel in the refrigeration cycle apparatus provides interconnection between the first heat exchanger and the second heat exchanger.

DESCRIPTION OF EMBODIMENTS

Figure 1:
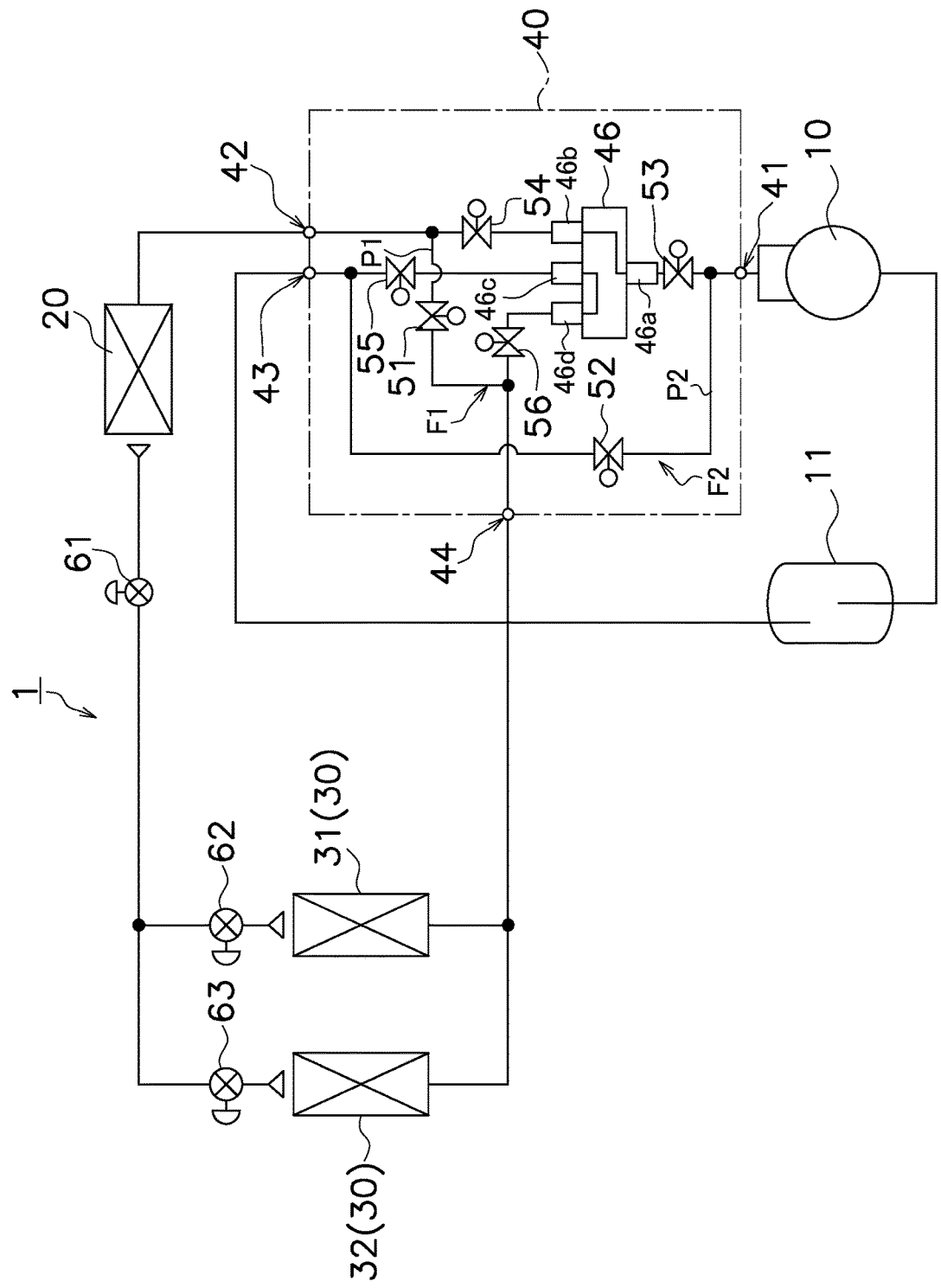
FIG. 1 is a circuit diagram illustrating a first connection state of a refrigeration cycle apparatus according to a first embodiment.
Figure 2:
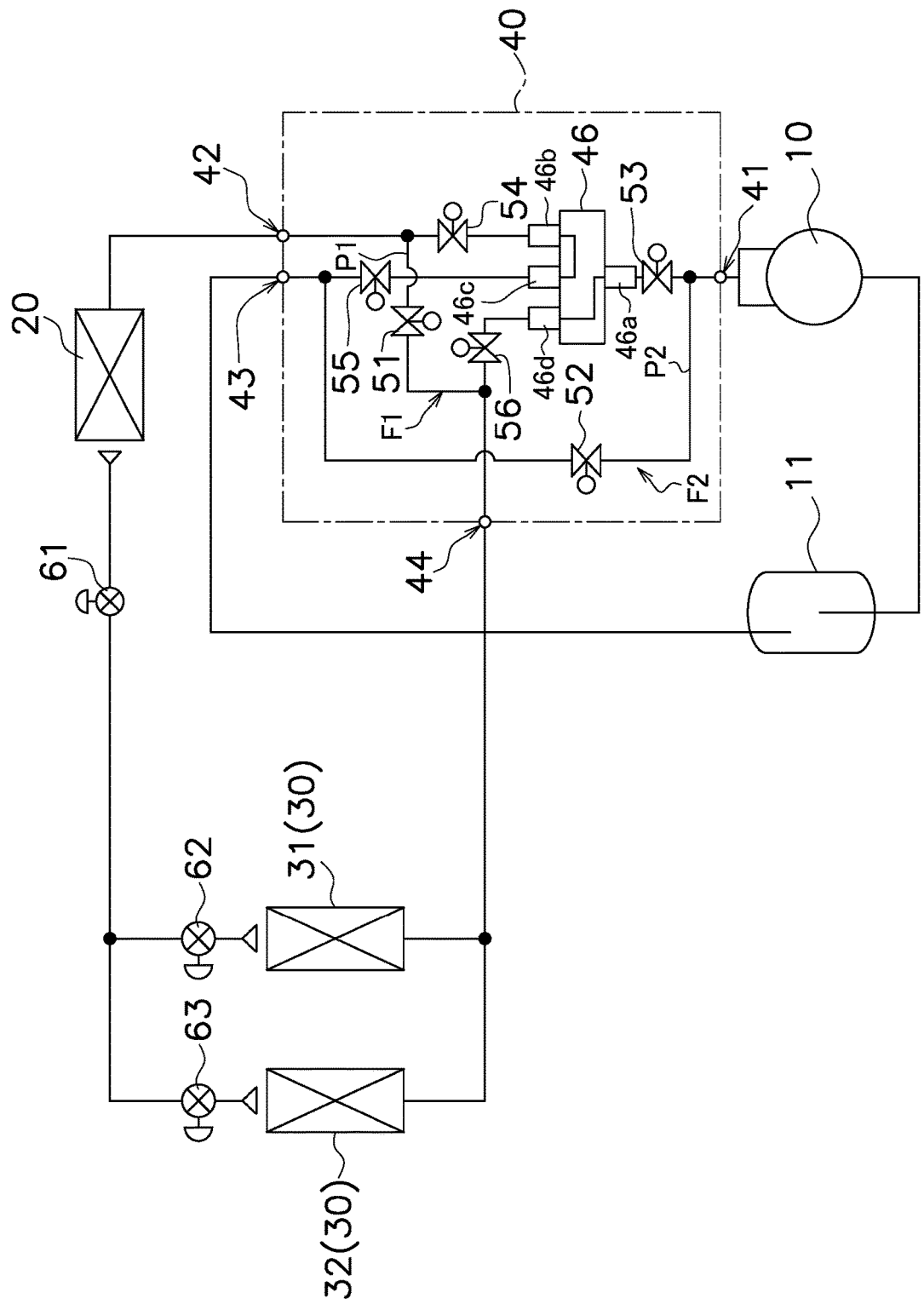
FIG. 2 is a circuit diagram illustrating a second connection state of the refrigeration cycle apparatus according to the first embodiment.

First Embodiment (1) Overview Referring to FIGS. 1 and 2, a refrigeration cycle apparatus 1 includes a compressor 10, a first heat exchanger 20, second heat exchangers 30, and a switching mechanism 40. The compressor 10 sucks in refrigerant, compresses the refrigerant, and then discharges the refrigerant. The first heat exchanger 20 functions as a radiator in a first cycle and functions as an evaporator in a second cycle. The second heat exchangers 30 each function as an evaporator in the first cycle and each function as a radiator in the second cycle. FIG. 1 illustrates the operation of the refrigeration cycle apparatus 1 in operation in the first cycle. FIG. 2 illustrates the operation of the refrigeration cycle apparatus 1 in operation in the second cycle.

The first heat exchanger 20 enables exchange of heat, for example, between outside air and refrigerant. The second heat exchangers 30 enables exchange of heat, for example, between room air and refrigerant. When the refrigeration cycle apparatus 1 operates in this operating condition, room air is cooled by the second heat exchangers 30 in the first cycle to cool a room, and room air is heated by the second heat exchangers 30 in the second cycle to heat the room. In such a case, the refrigeration cycle apparatus 1 is an air conditioner. The following describes embodiments in which the refrigeration cycle apparatus 1 is an air conditioner; however, it is not required that the refrigeration cycle apparatus 1 be an air conditioner. Refrigerant circulates through the refrigeration cycle apparatus 1, which can repeatedly perform a vapor compression refrigeration cycle accordingly. The refrigeration cycle apparatus is applicable to, for example, heat pump water heaters, refrigerators, and coolers that provide cooling for warehouses.

The switching mechanism 40 performs switching among a first connection state, a second connection state, and a third connection state. In the first connection state, the refrigeration cycle apparatus 1 repeatedly performs the first cycle, in which refrigerant flows through the compressor 10, the first heat exchanger 20, the second heat exchangers 30, and the compressor 10 in this order. In the second connection state, the refrigeration cycle apparatus 1 repeatedly performs the second cycle, in which refrigerant flows through the compressor 10, the second heat exchangers 30, the first heat exchanger 20, and the compressor 10 in this order. In the third connection state, the refrigeration cycle apparatus 1 closes a passage between the compressor 10 and the first heat exchanger 20 and a passage between the compressor 10 and the second heat exchangers 30. The refrigeration cycle apparatus 1 in the third connection state opens a first channel F1 to provide interconnection between the first heat exchanger 20 and the second heat exchangers 30. The workings of each component of the refrigeration cycle apparatus 1 in the first connection state, the second connection state, and the third connection state will be described later.

The switching mechanism 40 of the refrigeration cycle apparatus 1 goes through the third connection state while performing switching between the first connection state and the second connection state. In the third connection state, the first heat exchanger 20 can communicate with the second heat exchangers 30 through the first channel F1. Consequently, the difference between the pressure of refrigerant in the first heat exchanger 20 and the pressure of refrigerant in the second heat exchangers 30 is reduced at the time of switching between the first connection state and the second connection state. In this way, the refrigeration cycle apparatus 1 eliminates or reduces the possibility that a large quantity of refrigerant will flow out of the first heat exchanger 20 or the second heat exchangers 30 and into a low-pressure site.

(2) Details on Configuration (2-1) Overview of Switching Mechanism 40 of Refrigeration Cycle Apparatus 1

The switching mechanism 40 of the refrigeration cycle apparatus 1 includes a first port 41, a second port 42, a third port 43, and a fourth port 44. Refrigerant is compressed by the compressor 10 and then flows into the first port 41. The second port 42 communicates with the first heat exchanger 20. The refrigerant sucked into the compressor 10 flows out of the third port 43. Referring to FIGS. 1 and 2, the refrigeration cycle apparatus 1 includes a receiver 11, which forms a connection between the third port 43 and an inlet of the compressor 10. The fourth port 44 communicates with the second heat exchangers 30.

The switching mechanism 40 in the first connection state is as illustrated in FIG. 1, in which the first port 41 communicates with the second port 42, and the third port 43 communicates with the fourth port 44. The switching mechanism 40 in the second connection state is as illustrated in FIG. 2, in which the first port 41 communicates with the fourth port 44, and the second port 42 communicates with the third port 43.

(2-2) Configuration of Switching Mechanism 40

Referring to FIGS. 1 and 2, the switching mechanism 40 includes a four-way valve 46, a first on-off valve 51, a second on-off valve 52, a third on-off valve 53, a fourth on-off valve 54, a fifth on-off valve 55, a sixth on-off valve 56, a first bypass pipe P1, and a second bypass pipe P2. The four-way valve 46 is a slide-type switching valve including a valve element that slides along a straight line within the valve. The first bypass pipe P1 and the first on-off valve 51 are included in the first channel F1. The second bypass pipe P2 and the second on-off valve 52 are included in a second channel F2. The first bypass pipe P1 communicates with the second port 42 and the fourth port 44. The second bypass pipe P2 communicates with the first port 41 and the third port 43.

The first on-off valve 51 is provided to the first bypass pipe P1. The second on-off valve 52 is provided to the second bypass pipe P2. The first bypass pipe P1 in the first connection state and the second connection state is closed by the first on-off valve 51 of the first channel F1. The second bypass pipe P2 in the first connection state and the second connection state is closed by the second on-off valve 52 of the second channel F2. In the third connection state, the first on-off valve 51 and the second on-off valve 52 are opened, and the first bypass pipe P1 and the second bypass pipe P2 are opened accordingly.

The third on-off valve 53 is connected between an a-port 46a of the four-way valve 46 and a connection portion where an outlet of the compressor 10 is connected to the second bypass pipe P2. The fourth on-off valve 54 is connected between a b-port 46b of the four-way valve 46 and a connection portion where the second port 42 is connected to the first bypass pipe P1. The fifth on-off valve 55 is connected between a c-port 46c of the four-way valve 46 and a connection portion where the third port 43 is connected to the second bypass pipe P2. The fifth on-off valve 55 is connected between a d-port 46d of the four-way valve 46 and a connection portion where the fourth port 44 is connected to the first bypass pipe P1.

(2-3) Circuit Configuration of Refrigeration Cycle Apparatus 1 and Flow of Refrigerant in Circuit Referring to FIGS. 1 and 2, the refrigeration cycle apparatus 1 includes the compressor 10, the switching mechanism 40, the first heat exchanger 20, the second heat exchangers 30, a first expansion valve 61, a second expansion valve 62, a third expansion valve 63, and the receiver 11. The refrigeration cycle apparatus 1 illustrated in FIG. 1 includes two second heat exchangers, which are denoted by 31 and 32, respectively. It is not required that two second heat exchangers 30 be included; that is, the refrigeration cycle apparatus 1 may include three or more second heat exchangers 30 or may include one second heat exchanger 30. The following describes embodiments in which refrigerant in the refrigeration cycle apparatus 1 is carbon dioxide. It is not required that carbon dioxide be used as refrigerant in the refrigeration cycle apparatus 1. The refrigerant to be used in the refrigeration cycle apparatus 1 may be a fluorocarbon refrigerant or an ammonia refrigerant.

When performing the first cycle, the refrigeration cycle apparatus 1 is in the first connection state. In the first connection state (i.e., the state illustrated in FIG. 1), the first on-off valve 51 and the second on-off valve 52 are closed, and the third on-off valve 53, the fourth on-off valve 54, the fifth on-off valve 55, and the sixth on-off valve 56 are opened. Refrigerant in a supercritical state is discharged from the outlet of the compressor 10 and flows into the first heat exchanger 20 by way of the first port 41 and the second port 42 of the switching mechanism 40. In the first heat exchanger 20, heat is exchanged between the high-temperature, high-pressure refrigerant and air such that heat is taken out of the refrigerant. The first expansion valve 61 is fully opened. A flow of refrigerant coming out of the first expansion valve 61 flows into the second expansion valve 62 and the third expansion valve 63, where flows of refrigerant undergo decompression and expansion and then enter the second heat exchangers 31 and 32, respectively. In a case in which one of the second heat exchangers 31 and 32 is not used, one of the second expansion valve 62 and the third expansion valve 63 is closed and the closed one corresponds to the unused one. In the second heat exchangers 31 and 32, heat is exchanged between the low-temperature, low-pressure incoming refrigerant and air. After flowing out of the second heat exchangers 31 and 32, the refrigerant flows into the receiver 11 by way of the fourth port 44 and the third port 43 of the switching mechanism 40. While refrigerant in both liquid and gaseous form is retained in the receiver 11, the compressor 10 sucks in gas refrigerant through its inlet.

When performing the second cycle, the refrigeration cycle apparatus 1 is in the second connection state. In the second connection state (i.e., the state illustrated in FIG. 2), the first on-off valve 51 and the second on-off valve 52 are closed, and the third on-off valve 53, the fourth on-off valve 54, the fifth on-off valve 55, and the sixth on-off valve 56 are opened. Refrigerant in a supercritical state is discharged from the outlet of the compressor 10 and flows into the second heat exchangers 31 and 32 by way of the first port 41 and the fourth port 44 of the switching mechanism 40. In the second heat exchangers 31 and 32, heat is exchanged between the high-temperature, high-pressure refrigerant and air such that heat is taken out of the refrigerant. The second expansion valve 62 and the third expansion valve 63 are fully opened. A flow of refrigerant coming out of the second expansion valve 62 or the third expansion valve 63 flows into the first expansion valve 61, where the refrigerant undergoes decompression and expansion and then enters the first heat exchanger 20. In a case in which one of the second heat exchangers 31 and 32 is not used, one of the second expansion valve 62 and the third expansion valve 63 is closed and the closed one corresponds to the unused one. In the first heat exchanger 20, heat is exchanged between the low-temperature, low-pressure incoming refrigerant and air. After flowing out of the first heat exchanger 20, the refrigerant flows into the receiver 11 by way of the second port 42 and the third port 43 of the switching mechanism 40. While refrigerant in both liquid and gaseous form is retained in the receiver 11, the compressor 10 sucks in gas refrigerant through its inlet.

(2-4) Switching Between First Cycle and Second Cycle of Refrigeration Cycle Apparatus 1

In the first embodiment, switching between the first connection state and the second connection state is performed to enable switching between the first cycle and the second cycle. The switching mechanism 40 goes through the third connection state while making a transition from the first connection state to the second connection state or while making a transition from the second connection state to the first connection state. In the third connection state, the third on-off valve 53, the fourth on-off valve 54, the fifth on-off valve 55, and the sixth on-off valve 56 are closed, and the first on-off valve 51 and the second on-off valve 52 are then opened.

In the first connection state prior to a transition from the first connection state to the second connection state, the refrigerant is at high pressure when flowing through the first heat exchanger 20, and the refrigerant is at low pressure when flowing through the second heat exchangers 31 and 32 (the second heat exchangers 30). In this case, the refrigerant is at high pressure when flowing through regions located downstream of the outlet of the compressor 10, and the refrigerant is at low pressure when flowing through regions located upstream of the inlet of the compressor 10. In the second connection state prior to a transition from the second connection state to the first connection state, the refrigerant is at low pressure when flowing through the first heat exchanger 20, and the refrigerant is at high pressure when flowing through the second heat exchangers 31 and 32 (the second heat exchangers 30). In this case, the refrigerant is at high pressure when flowing through regions located downstream of the outlet of the compressor 10, and the refrigerant is at low pressure when flowing through regions located upstream of the inlet of the compressor 10.

The switching mechanism 40 goes through the third connection state while making a transition from the first connection state to the second connection state. When the switching mechanism 40 is in the third connection state, the refrigerant flows through the first channel F1 (the first bypass pipe P1 and the first on-off valve 51) and then flows into the first heat exchanger 20 and toward the second heat exchangers 31 and 32 (the second heat exchangers 30). The difference between the pressure of refrigerant in the first heat exchanger 20 and the pressure of refrigerant in the second heat exchangers 31 and 32 (the second heat exchangers 30) is reduced or eliminated due to the flow of refrigerant from the first heat exchanger 20 to the second heat exchangers 31 and 32 (the second heat exchangers 30).

The switching mechanism 40 goes through the third connection state while making a transition from the second connection state to the first connection state. When the switching mechanism 40 is in the third connection state, the refrigerant flows through the first channel F1 (the first bypass pipe P1 and the first on-off valve 51) and then flows into the second heat exchangers 31 and 32 (the second heat exchangers 30) and toward the first heat exchanger 20. The difference between the pressure of refrigerant in the first heat exchanger 20 and the pressure of refrigerant in the second heat exchangers 31 and 32 (the second heat exchangers 30) is reduced or eliminated due to the flow of refrigerant from the second heat exchangers 31 and 32 (the second heat exchangers 30) to the first heat exchanger 20.

When the switching mechanism 40 is in the third connection state, the refrigerant flows through regions located downstream of the outlet of the compressor 10 to the receiver 11 located upstream of the inlet of the compressor 10 by way of the second channel F2 (the second bypass pipe P2 and the second on-off valve 52). The difference between the pressure of refrigerant flowing through regions located downstream of the outlet of the compressor 10 and the pressure of refrigerant flowing through regions located upstream of the inlet of the compressor 10 is reduced or eliminated due to the flow of refrigerant from the compressor 10 to the receiver 11.

(2-5) Control of Refrigeration Cycle Apparatus 1

Figure 3:
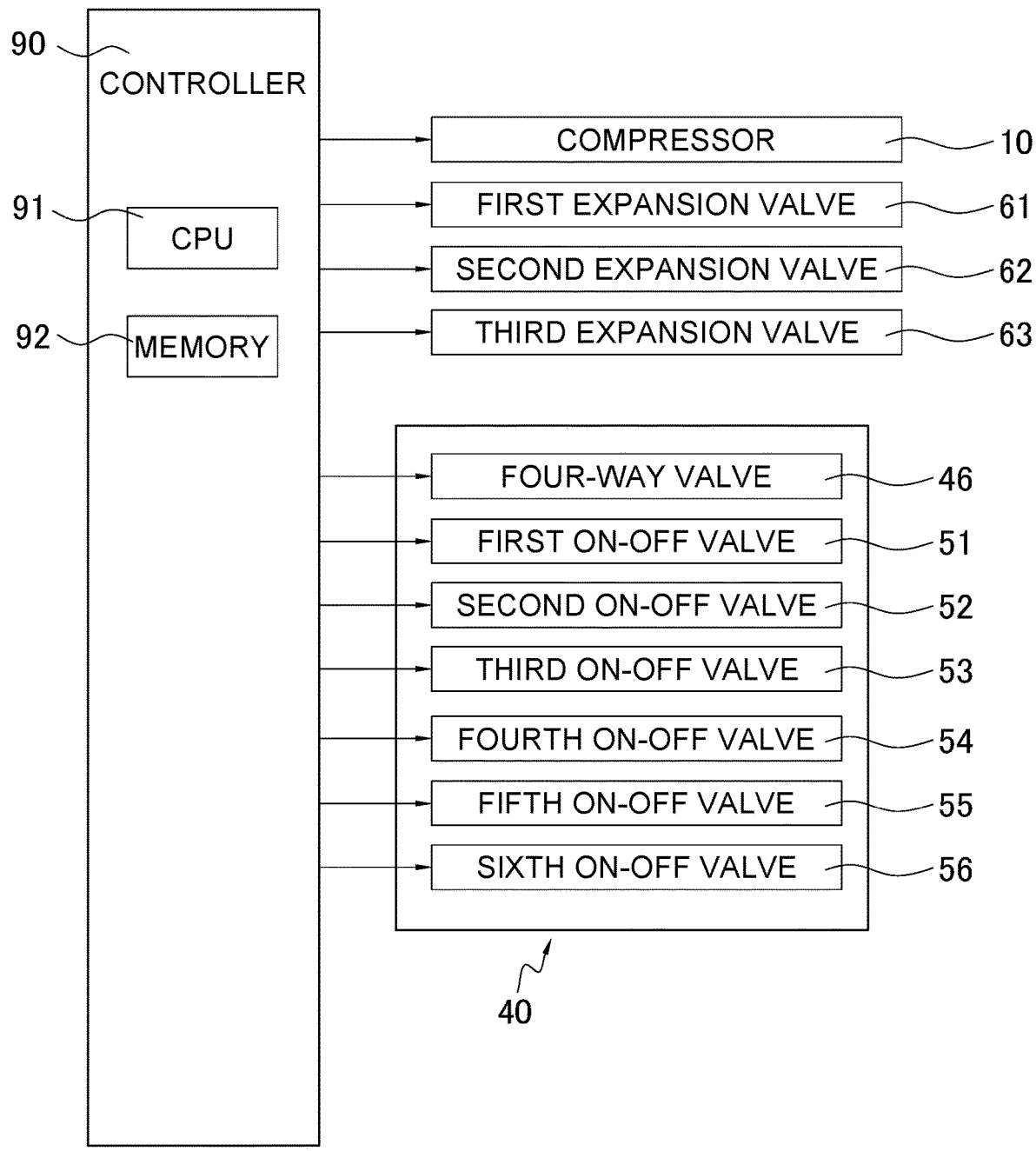
FIG. 3 is a block diagram for explanation of a controller according to the first embodiment.

The refrigeration cycle apparatus 1 according to the first embodiment includes a controller 90 (see FIG. 3) to cause internal devices to implement the operation described above. The controller 90 is, for example, a computer. The computer includes, for example, a control arithmetic unit and a storage unit. The control arithmetic unit may be a processor. Referring to FIG. 3, the controller 90 includes a CPU 91, which is a processor. For example, the control arithmetic unit reads a program stored in the storage unit and executes the program to perform predetermined processing, such as image processing, arithmetic processing, or sequential processing. The control arithmetic unit can also execute programs to record results of arithmetic operations onto the storage unit and to read information stored in the storage unit. The storage unit may be used as a database. Memory 92 is included as the storage unit in the controller 90.

The controller 90 controls the compressor 10, the first expansion valve 61, the second expansion valve 62, the third expansion valve 63, and the switching mechanism 40. The controller 90 controls the four-way valve 46 and six valves (the first on-off valve 51, the second on-off valve 52, the third on-off valve 53, the fourth on-off valve 54, the fifth on-off valve 55, and the sixth on-off valve 56) such that switching of the switching mechanism 40 is controlled. The six valves (the first on-off valve 51, the second on-off valve 52, the third on-off valve 53, the fourth on-off valve 54, the fifth on-off valve 55, and the sixth on-off valve 56) may each be an electromagnetic valve that is capable of switching between the opened state and the closed state in accordance with a signal from the controller 90.

In the first connection state, the controller 90 sets the four-way valve 46 into the state illustrated in FIG. 1, in which the a-port 46a communicates with the b-port 46b, and the c-port 46c communicates with the d-port 46d. In the first connection state, the controller 90 sets the on-off valves into the state in which the first on-off valve 51 and the second on-off valve 52 are closed, and the other on-off valves (the third on-off valve 53, the fourth on-off valve 54, the fifth on-off valve 55, and the sixth on-off valve 56) are opened. When a transition from the first connection state to the third connection state takes place, the controller 90 causes the four on-off valves (the third on-off valve 53, the fourth on-off valve 54, the fifth on-off valve 55, and the sixth on-off valve 56) to close, with the four-way valve 46 remaining in the first connection state. The controller 90 then causes the first on-off valve 51 and the second on-off valve 52 to open. When a transition from the third connection state to the second connection state takes place, the controller 90 causes the first on-off valve 51 and the second on-off valve 52 to close. The controller 90 then sets the four-way valve 46 into the state illustrated in FIG. 2, in which the a-port 46a communicates with the d-port 46d, and the c-port 46c communicates with the b-port 46b. In this state, the controller 90 causes the four on-off valves (the third on-off valve 53, the fourth on-off valve 54, the fifth on-off valve 55, and the sixth on-off valve 56) to open.

In the second connection state, the controller 90 sets the four-way valve 46 into the state illustrated in FIG. 2. In the second connection state, the controller 90 sets the on-off valves into the state in which the first on-off valve 51 and the second on-off valve 52 are closed, and the other on-off valves (the third on-off valve 53, the fourth on-off valve 54, the fifth on-off valve 55, and the sixth on-off valve 56) are opened. When a transition from the second connection state to the third connection state takes place, the controller 90 causes the four on-off valves (the third on-off valve 53, the fourth on-off valve 54, the fifth on-off valve 55, and the sixth on-off valve 56) to close, with the four-way valve 46 remaining in the second connection state. The controller 90 then causes the first on-off valve 51 and the second on-off valve 52 to open. When a transition from the third connection state to the second connection state takes place, the controller 90 causes the first on-off valve 51 and the second on-off valve 52 to close. The controller 90 then sets the four-way valve 46 into the state illustrated in FIG. 1 and causes the four on-off valves (the third on-off valve 53, the fourth on-off valve 54, the fifth on-off valve 55, and the sixth on-off valve 56) to open.

Second Embodiment (3) Overview

As with the refrigeration cycle apparatus 1 according to the first embodiment (see FIGS. 1 and 2), a refrigeration cycle apparatus 1 according to a second embodiment (see FIGS. 4, 5, and 6) includes a compressor 10, a first heat exchanger 20, second heat exchangers 30, and a switching mechanism 40. The overview of the refrigeration cycle apparatus 1 according to the first embodiment has been described above under the heading "(1) Overview", which also holds true for the refrigeration cycle apparatus 1 according to the second embodiment and will not be further elaborated here.

(4) Details on Configuration (4-1) Overview of Switching Mechanism 40 of Refrigeration Cycle Apparatus 1

Figure 4:
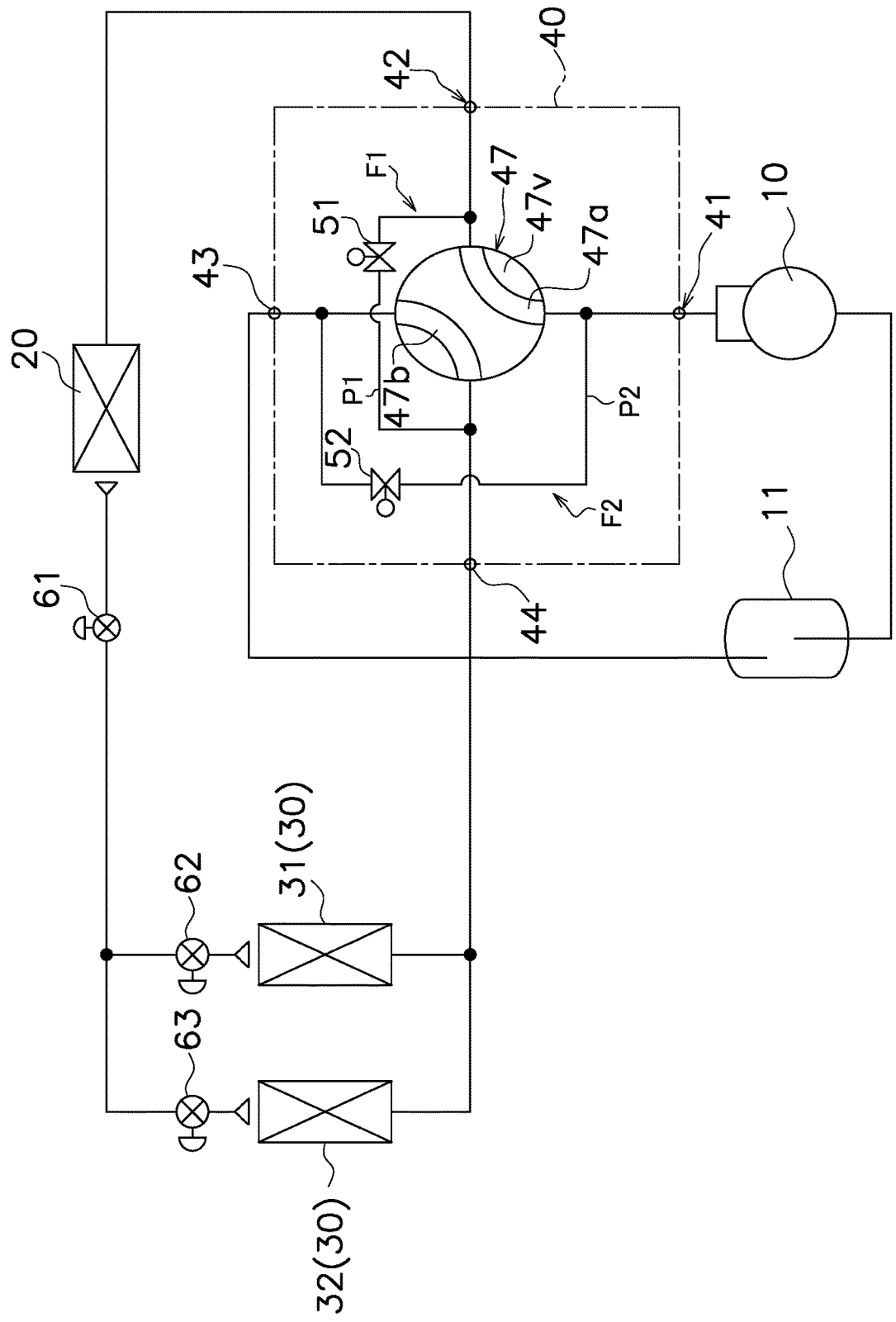
FIG. 4 is a circuit diagram illustrating a first connection state of a refrigeration cycle apparatus according to a second embodiment.
Figure 5:
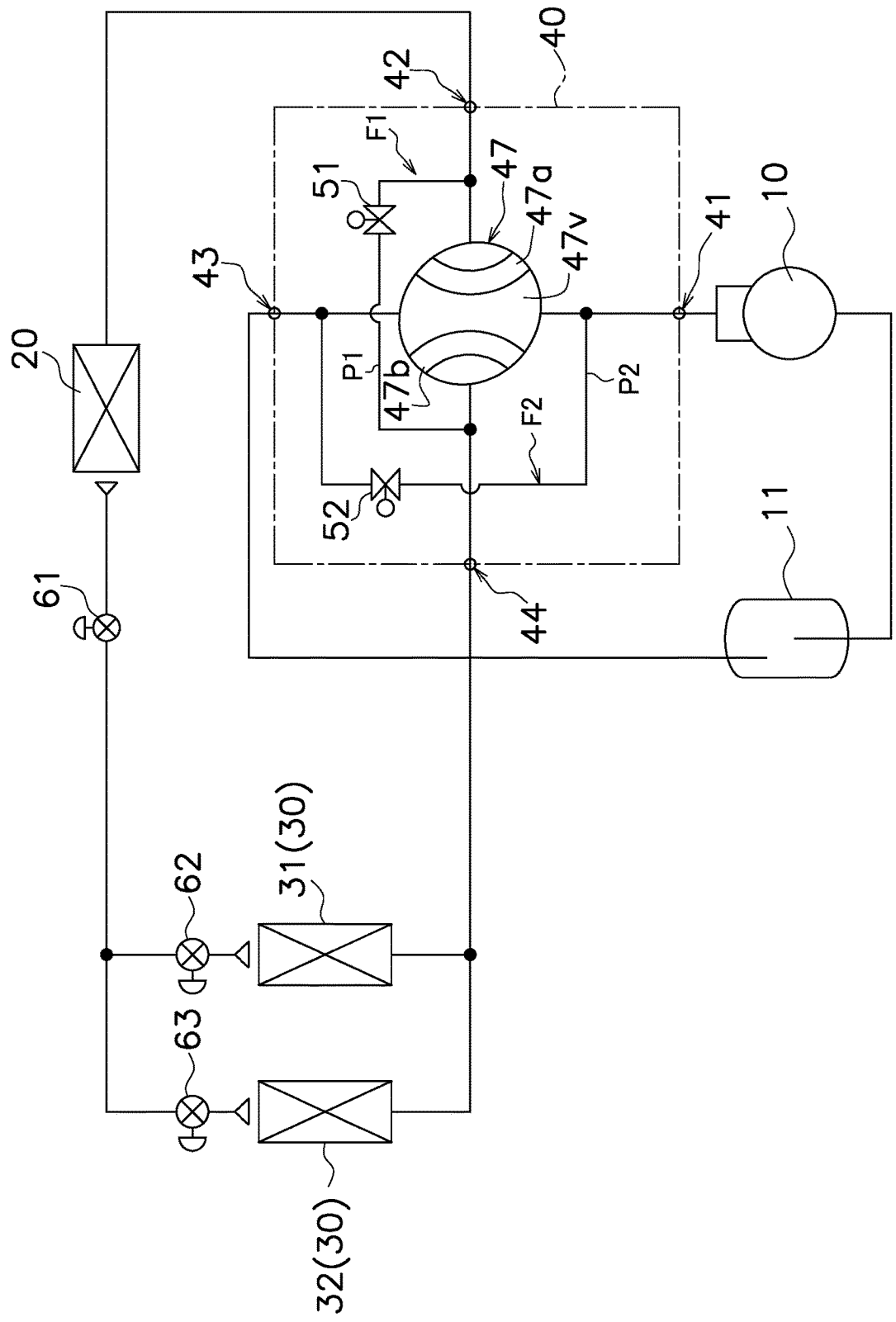
FIG. 5 is a circuit diagram illustrating a third connection state of a refrigeration cycle apparatus according to the second embodiment.
Figure 6:
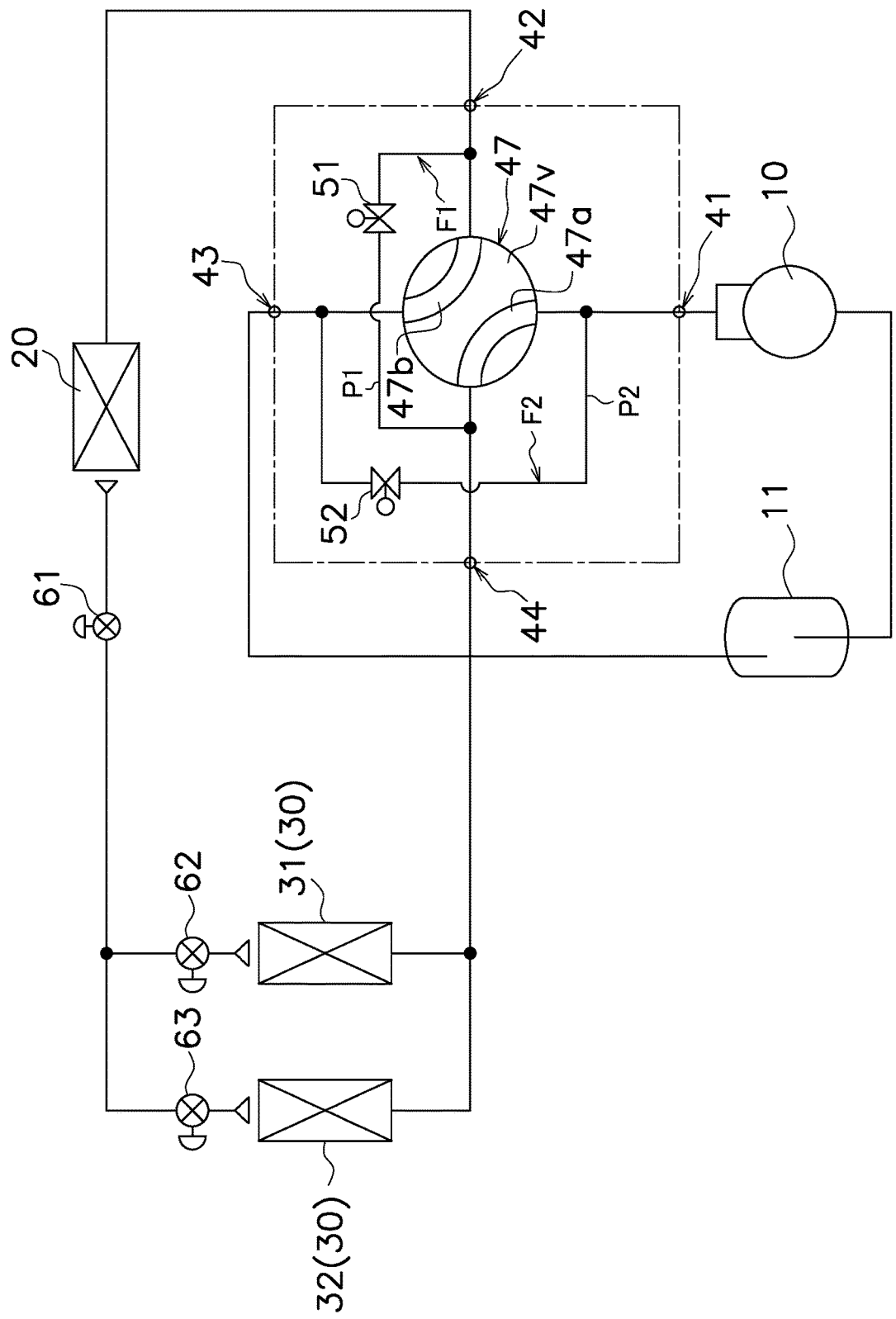
FIG. 6 is a circuit diagram illustrating a second connection state of a refrigeration cycle apparatus according to the second embodiment.

Referring to FIGS. 4 to 6, the switching mechanism 40 of the refrigeration cycle apparatus 1 includes a first port 41, a second port 42, a third port 43, and a fourth port 44. Refrigerant is compressed by the compressor 10 and then flows into the first port 41. The second port 42 communicates with the first heat exchanger 20. The refrigerant flows through the third port 43 and is then sucked into the compressor 10. Referring to FIGS. 4 and 6, the refrigeration cycle apparatus 1 includes a receiver 11, which forms a connection between the third port 43 and an inlet of the compressor 10. The fourth port 44 communicates with the second heat exchangers 30.

The switching mechanism 40 in the first connection state is as illustrated in FIG. 4, in which the first port 41 communicates with the second port 42, and the third port 43 communicates with the fourth port 44. The switching mechanism 40 in the third connection state is as illustrated in FIG. 5, in which the second port 42 communicates with the fourth port 44, and the first port 41 communicates with the third port 43. The switching mechanism 40 in the second connection state is as illustrated in FIG. 6, in which the first port 41 communicates with the fourth port 44, and the second port 42 communicates with the third port 43.

(4-2) Configuration of Switching Mechanism 40

Figure 7:
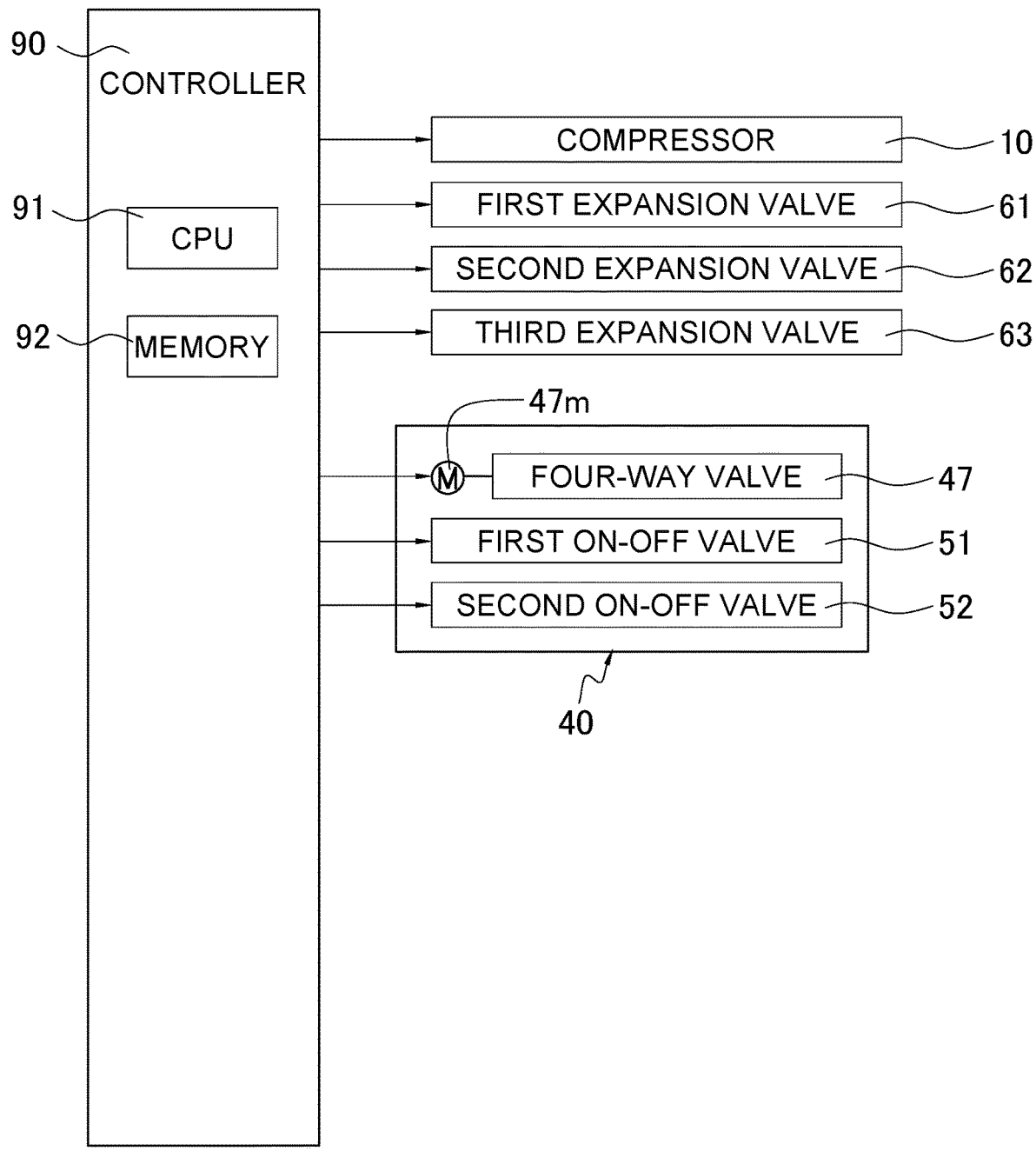
FIG. 7 is a block diagram for explanation of a controller according to the second embodiment.

Referring to FIGS. 4 and 6, the switching mechanism 40 includes a four-way valve 47, a first on-off valve 51, a second on-off valve 52, a first bypass pipe P1, and a second bypass pipe P2. The four-way valve 47 is a rotary-type switching valve including a valve element 47v that rotates within the valve. That is, the four-way valve 47 is a rotary valve. The valve element 47v includes a first inner flow path 47a and a second inner flow path 47b. The valve element 47v is powered by a motor 47m (see FIG. 7) to rotate. The valve element 47v of the four-way valve 47 rotates 90 degrees to enable switching between the first connection state and the second connection state. The valve element 47v of the four-way valve 47 can rotate 90 degrees to effect a transition from one state (in which the first port 41 communicates with the second port 42, and the third port 43 communicates with the fourth port 44) to another state (in which the first port 41 communicates with the fourth port 44, and the second port 42 communicates with the third port 43). The valve element 47v of the four-way valve 47 can rotate 45 degrees to effect a transition from the first connection state to the third connection state or a transition from the second connection state to the third connection state. Although an embodiment will be described in which the valve element 47v rotates 90 degrees or 45 degrees, the angle of rotation required for switching of the four-way valve 47 is not limited to these degrees. In some embodiments, the switching of the four-way valve 47 is effected by rotation to a desired angle.

The first bypass pipe P1 and the first on-off valve 51 are included in a first channel F1. The second bypass pipe P2 and the second on-off valve 52 are included in a second channel F2. The first bypass pipe P1 communicates with the second port 42 and the fourth port 44. The second bypass pipe P2 communicates with the first port 41 and the third port 43.

The first on-off valve 51 is provided to the first bypass pipe P1. The second on-off valve 52 is provided to the second bypass pipe P2. The first bypass pipe P1 in the first connection state and the second connection state is closed by the first on-off valve 51 of the first channel F1. The second bypass pipe P2 in the first connection state and the second connection state is closed by the second on-off valve 52 of the second channel F2. In the third connection state, the first on-off valve 51 and the second on-off valve 52 are opened, and the first bypass pipe P1 and the second bypass pipe P2 are opened accordingly.

(4-3) Circuit Configuration of Refrigeration Cycle Apparatus 1 and Flow of Refrigerant in Circuit The difference between the circuit configuration of the refrigeration cycle apparatus 1 according to the first embodiment and the circuit configuration of the refrigeration cycle apparatus 1 according to the second embodiment is in the internal configuration of the switching mechanism 40, and the circuit configuration in the second embodiment is otherwise identical to the circuit configuration in the first embodiment. Thus, the circuit configuration of the refrigeration cycle apparatus 1 according to the second embodiment and the flow of refrigeration cycle apparatus in the circuit will not be further elaborated here.

(4-4) Switching between First Cycle and Second Cycle of Refrigeration Cycle Apparatus 1

In the first embodiment, switching between the first connection state and the second connection state is performed to enable switching between the first cycle and the second cycle. The same holds true for the second embodiment. The switching mechanism 40 goes through the third connection state while making a transition from the first connection state to the second connection state or while making a transition from the second connection state to the first connection state. The valve element 47v rotates 45 degrees to effect a transition from the first connection state to the third connection state or a transition from the second connection state to the third connection state. Once the valve element 47v completes a 45-degree turn, the first inner flow path 47a and the second inner flow path 47b are connected to none of the four ports (the first port 41, the second port 42, the third port 43, and the fourth port 44). In other words, the valve element 47v does not provide interconnection between the four ports (the first port 41, the second port 42, the third port 43, and the fourth port 44). When a transition from the first connection state to the third connection state or a transition from the second connection state to the third connection state takes place, the switching mechanism 40 opens the first on-off valve 51 and the second on-off valve 52 after the rotation of the valve element 47v.

When the switching mechanism 40 in the second embodiment goes through the third connection state, the difference between the pressure of refrigerant in the first heat exchanger 20 and the pressure of refrigerant in the second heat exchangers 31 and 32 (the second heat exchangers 30) is reduced or eliminated, as has been described above in relation to the first embodiment. When the switching mechanism 40 in the second embodiment goes through the third connection state, the difference between the pressure of refrigerant flowing through regions located downstream of the outlet of the compressor 10 and the pressure of refrigerant flowing through regions located upstream of the inlet of the compressor 10 is reduced or eliminated, as has been described above in relation to the first embodiment.

(4-5) Control of Refrigeration Cycle Apparatus 1

The refrigeration cycle apparatus 1 according to the second embodiment includes a controller 90 (see FIG. 7) to cause internal devices to implement the operation described above. A CPU 91 and memory 92 are included as a processor and a storage unit, respectively, in the controller 90 according to the second embodiment, as in the controller 90 according to the first embodiment.

The difference between the controller 90 according to the first embodiment and the controller 90 according to the second embodiment is in the control of the switching mechanism 40. The following describes the way the controller 90 controls the switching mechanism 40. The controller 90 according to the second embodiment controls the four-way valve 47, the first on-off valve 51, and the second on-off valve 52 such that switching of the switching mechanism 40 is controlled. The first on-off valve 51 and the second on-off valve 52 may each be an electromagnetic valve that is capable of switching between the opened state and the closed state in accordance with a signal from the controller 90. The motor 47m provided to the four-way valve 47 may be a stepping motor capable of adjusting the angle of rotation in accordance with a signal from the controller 90.

In the first connection state, the controller 90 sets the four-way valve 47 into the state illustrated in FIG. 4, in which the first port 41 communicates with the second port 42, and the third port 43 communicates with the fourth port 44. Under the control of the controller 90, the first on-off valve 51 and the second on-off valve 52 in the first connection state are kept in the closed state. When a transition from the first connection state to the third connection state takes place, the controller 90 controls the motor 47m in such a manner that the valve element 47v of the four-way valve 47 rotates 45 degrees (see FIG. 5). The controller 90 then causes the first on-off valve 51 and the second on-off valve 52 to open. When a transition from the third connection state to the second connection state takes place, the controller 90 causes the first on-off valve 51 and the second on-off valve 52 to close. The controller 90 then causes the valve element 47v of the four-way valve 47 to rotate 45 degrees, where a 90-degree turn relative to the valve element 47v in the first connection state is made. The switching mechanism 40 is thus brought into the state illustrated in FIG. 6, in which the first port 41 communicates with the fourth port 44, and the third port 43 communicates with the second port 42.

In the second connection state, the controller 90 may, for example, set the four-way valve 47 into the state illustrated in FIG. 6. Under the control of the controller 90, the first on-off valve 51 and the second on-off valve 52 in the second connection state are kept in the closed state. When a transition from the second connection state to the third connection state takes place, the controller 90 controls the motor 47m in such a manner that the valve element 47v of the four-way valve 47 rotates 45 degrees (see FIG. 5). The controller 90 then causes the first on-off valve 51 and the second on-off valve 52 to open. When a transition from the third connection state to the first connection state takes place, the controller 90 causes the first on-off valve 51 and the second on-off valve 52 to close. The controller 90 then causes the valve element 47v of the four-way valve 47 to rotate 45 degrees, where a 90-degree turn relative to the valve element 47v in the second connection state is made. The switching mechanism 40 is thus brought into the state illustrated in FIG. 4, in which the first port 41 communicates with the second port 42, and the third port 43 communicates with the fourth port 44.

The valve element 47v described above rotates counterclockwise to effect a transition from the first connection state to the second connection state and rotates clockwise to effect a transition from the second connection state to the first connection state. It is not required that the rotation of the valve element 47v be controlled in the manner mentioned above. In some embodiments, the valve element 47v under the control of the controller 90 rotates clockwise to effect a transition from the first connection state to the second connection state and rotates clockwise to effect a transition from the second connection state to the first connection state.

Third Embodiment (5) Overview

As with the refrigeration cycle apparatus 1 according to the first embodiment (see FIGS. 1 and 2), a refrigeration cycle apparatus 1 according to a third embodiment (see FIGS. 8, 9, and 10) includes a compressor 10, a first heat exchanger 20, second heat exchangers 30, and a switching mechanism 40. The overview of the refrigeration cycle apparatus 1 according to the first embodiment has been described above under the heading "(1) Overview", which also holds true for the refrigeration cycle apparatus 1 according to the third embodiment and will not be further elaborated here.

(6) Details on Configuration (6-1) Overview of Switching Mechanism 40 of Refrigeration Cycle Apparatus 1

Figure 8:
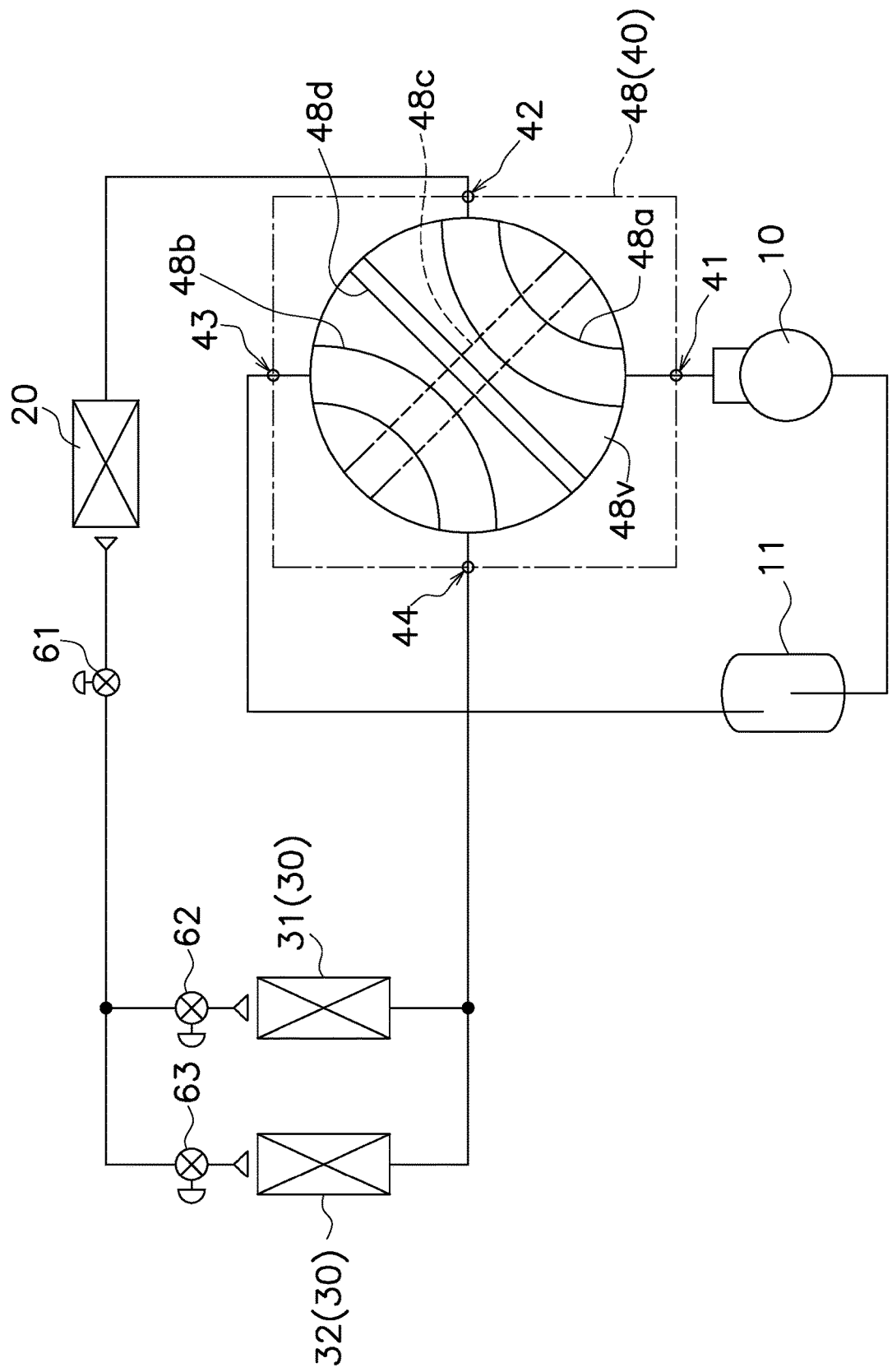
FIG. 8 is a circuit diagram illustrating a first connection state of a refrigeration cycle apparatus according to a third embodiment.
Figure 9:
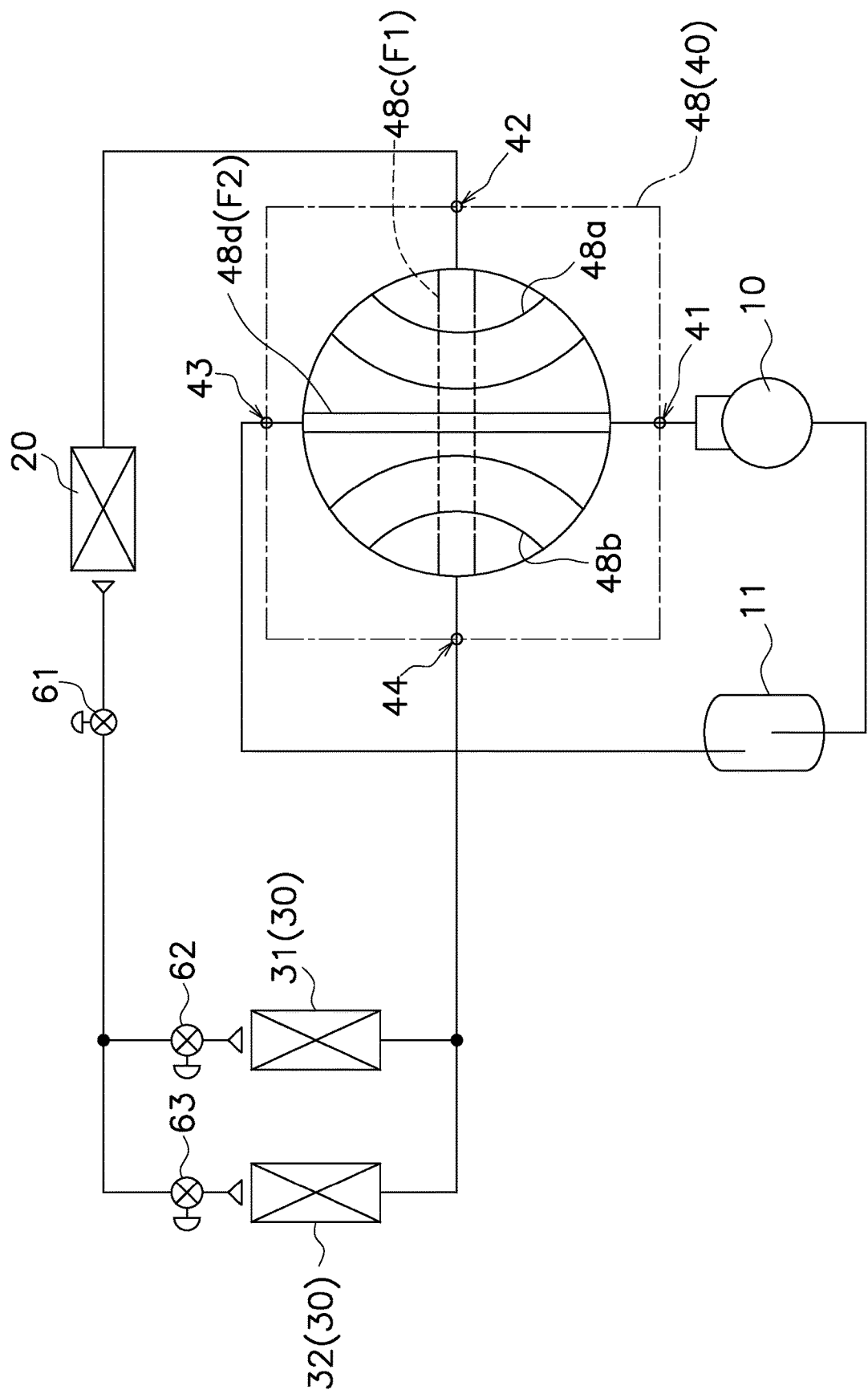
FIG. 9 is a circuit diagram illustrating a third connection state of the refrigeration cycle apparatus according to the third embodiment.
Figure 10:
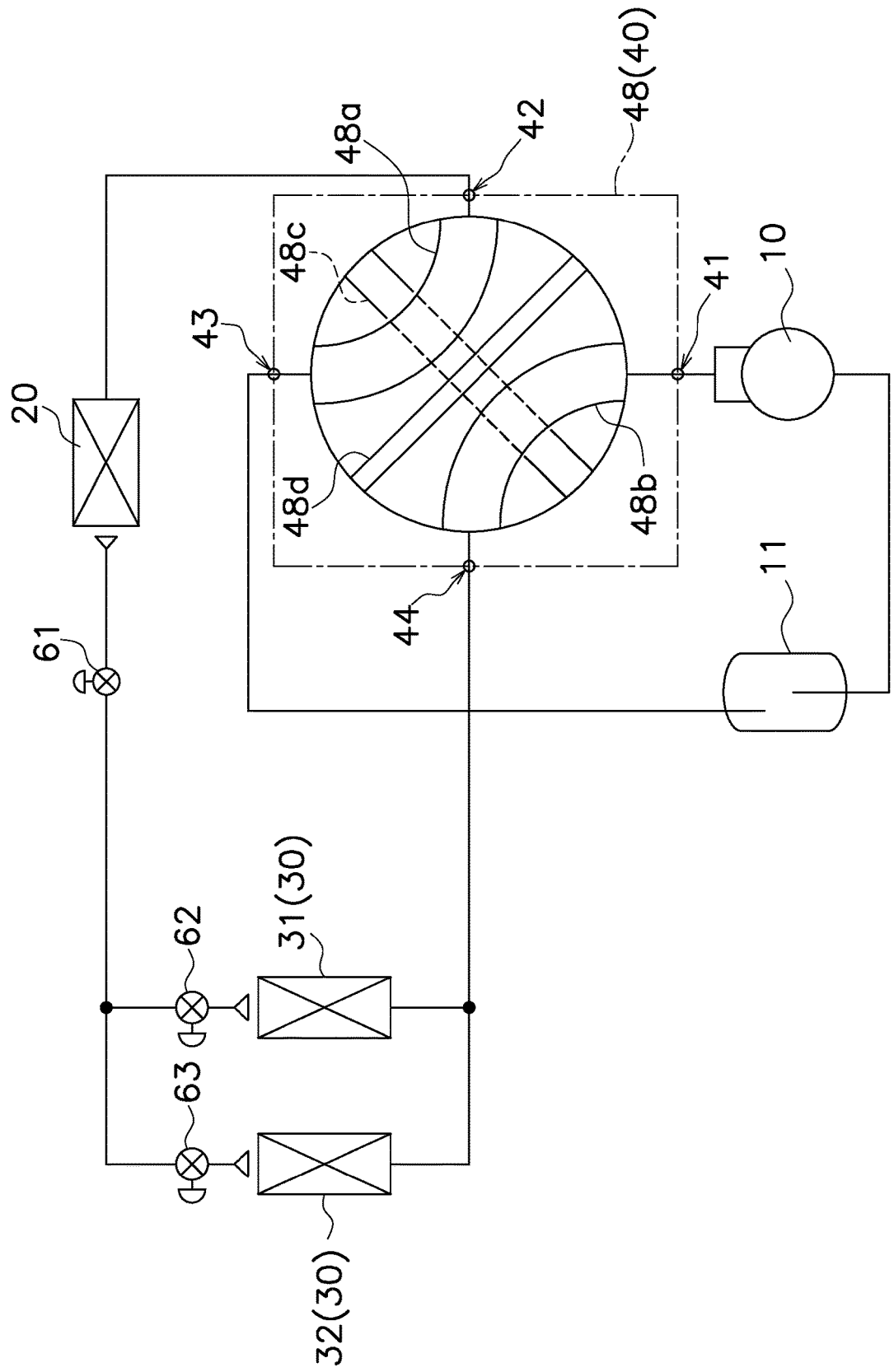
FIG. 10 is a circuit diagram illustrating a second connection state of the refrigeration cycle apparatus according to the third embodiment.

Referring to FIGS. 8 to 10, the switching mechanism 40 of the refrigeration cycle apparatus 1 includes a first port 41, a second port 42, a third port 43, and a fourth port 44. Refrigerant is compressed by the compressor 10 and then flows into the first port 41. The second port 42 communicates with the first heat exchanger 20. The refrigerant flows through the third port 43 and is then sucked into the compressor 10. Referring to FIGS. 8 and 10, the refrigeration cycle apparatus 1 includes a receiver 11, which forms a connection between the third port 43 and an inlet of the compressor 10. The fourth port 44 communicates with the second heat exchangers 30.

The switching mechanism 40 in the first connection state is as illustrated in FIG. 8, in which the first port 41 communicates with the second port 42, and the third port 43 communicates with the fourth port 44. The switching mechanism 40 in the third connection state is as illustrated in FIG. 9, in which the second port 42 communicates with the fourth port 44, and the first port 41 communicates with the third port 43. The switching mechanism 40 in the second connection state is as illustrated in FIG. 10, in which the first port 41 communicates with the fourth port 44, and the second port 42 communicates with the third port 43.

(6-2) Configuration of Switching Mechanism 40

Referring to FIGS. 8 and 10, the switching mechanism 40 includes a four-way valve 48. The first port 41, the second port 42, the third port 43, and the fourth port 44 of the switching mechanism 40 are also regarded as a first port 41, a second port 42, a third port 43, and a fourth port 44 of the four-way valve 48. The four-way valve 48 is a rotary-type switching valve including a valve element 48v that rotates within the valve. That is, the four-way valve 48 is a rotary valve. The valve element 48v includes a first inner flow path 48a, a second inner flow path 48b, a first bypass channel 48c, and a second bypass channel 48d. The first inner flow path 48a, the second inner flow path 48b, the first bypass channel 48c, and the second bypass channel 48d are channels provided in the valve element 48v, which is rotatable. The four-way valve 48 is designed such that the first bypass channel 48c and each of the first inner flow path 48a, the second inner flow path 48b, and the second bypass channel 48d cross at different levels. Thus, the first inner flow path 48a, the second inner flow path 48b, the first bypass channel 48c, and the second bypass channel 48d do not communicate with each other within the valve element 48v. The Cv value of the first bypass channel 48c is greater than the Cv value of the second bypass channel 48d. More specifically, the valve element 48v is designed such that the flow path cross-sectional area of the first bypass channel 48c is greater than the flow path cross-sectional area of the second bypass channel 48d.

Figure 11:
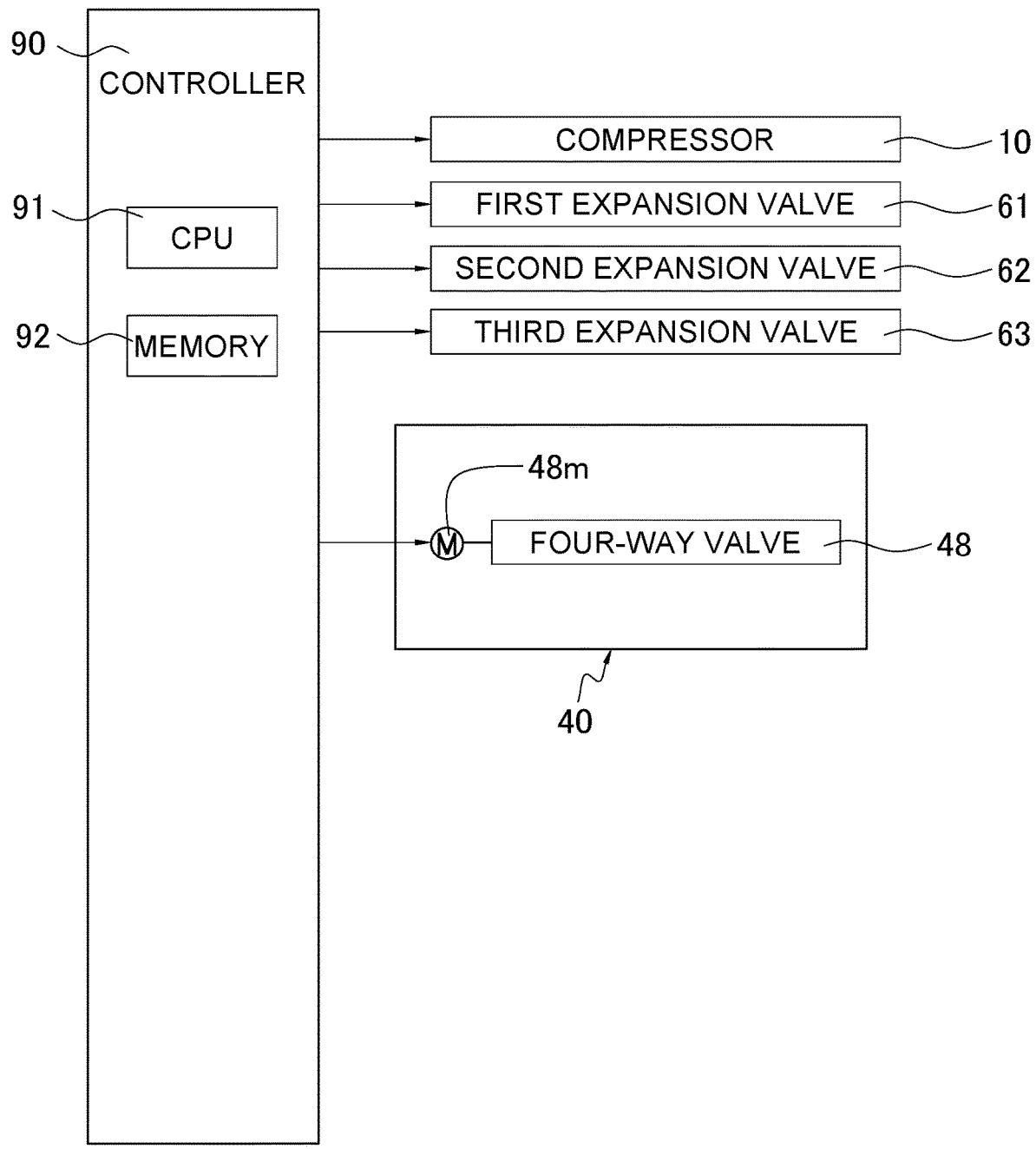
FIG. 11 is a block diagram for explanation of a controller according to the third embodiment.

The valve element 48v is powered by a motor 48m (see FIG. 11) to rotate. The valve element 48v of the four-way valve 48 rotates 90 degrees to enable switching between the first connection state and the second connection state. The valve element 48v of the four-way valve 48 can rotate 90 degrees to effect a transition from one state (in which the first port 41 communicates with the second port 42, and the third port 43 communicates with the fourth port 44) to another state (in which the first port 41 communicates with the fourth port 44, and the second port 42 communicates with the third port 43). The valve element 48v of the four-way valve 48 can rotate 45 degrees to effect a transition from the first connection state to the third connection state or a transition from the second connection state to the third connection state. Although an embodiment will be described in which the valve element 48v rotates 90 degrees or 45 degrees, the angle of rotation required for switching of the four-way valve 48 is not limited to these degrees. In some embodiments, the switching of the four-way valve 48 is effected by rotation to a desired angle.

The second port 42 communicates with the fourth port 44 through the first bypass channel 48c when the valve element 48v is in the state illustrated in FIG. 9 (the third connection state). The first port 41 communicates with the third port 43 through the second bypass channel 48d when the valve element 48v is in the state illustrated in FIG. 9 (the third connection state). In the first connection state (see FIG. 8) and the second connection state (see FIG. 10), neither the first bypass channel 48c nor the second bypass channel 48d is connected to the outside of the valve element 48v; that is, the first bypass channel 48c and the second bypass channel 48d are blocked. The first bypass channel 48c and the second bypass channel 48d in the third embodiment are thus analogous to the first channel F1 and the second channel F2, respectively.

(6-3) Circuit Configuration of Refrigeration Cycle Apparatus 1 and Flow of Refrigerant in Circuit The difference between the circuit configuration of the refrigeration cycle apparatus 1 according to the first embodiment and the circuit configuration of the refrigeration cycle apparatus 1 according to the third embodiment is in the internal configuration of the switching mechanism 40, and the circuit configuration in the third embodiment is otherwise identical to the circuit configuration in the first embodiment. Thus, the circuit configuration of the refrigeration cycle apparatus 1 according to the third embodiment and the flow of refrigeration cycle apparatus in the circuit will not be further elaborated here.

(6-4) Switching between First Cycle and Second Cycle of Refrigeration Cycle Apparatus 1

In the first embodiment, switching between the first connection state and the second connection state is performed to enable switching between the first cycle and the second cycle. The same holds true for the third embodiment. The switching mechanism 40 goes through the third connection state while making a transition from the first connection state to the second connection state or while making a transition from the second connection state to the first connection state. The valve element 48v rotates 45 degrees to effect a transition from the first connection state to the third connection state or a transition from the second connection state to the third connection state. Once the valve element 48v completes a 45-degree turn, the first inner flow path 48a and the second inner flow path 48b are connected to none of the four ports (the first port 41, the second port 42, the third port 43, and the fourth port 44). In other words, the four ports (the first port 41, the second port 42, the third port 43, and the fourth port 44) do not communicate with each other through either the first inner flow path 48a or the second inner flow path 48b. The switching mechanism 40 in the third connection state allows the second port 42 to communicate with the fourth port 44 through the first bypass channel 48c. The switching mechanism 40 in the third connection state also allows the first port 41 to communicate with the third port 43 through the second bypass channel 48d.

When the switching mechanism 40 in the third embodiment goes through the third connection state, the difference between the pressure of refrigerant in the first heat exchanger 20 and the pressure of refrigerant in the second heat exchangers 31 and 32 (the second heat exchangers 30) is reduced or eliminated, as has been described above in relation to the first embodiment. When the switching mechanism 40 in the third embodiment goes through the third connection state, the difference between the pressure of refrigerant flowing through regions located downstream the outlet of the compressor 10 and the pressure of refrigerant flowing through regions located upstream of the inlet of the compressor 10 is reduced or eliminated, as has been described above in relation to the first embodiment.

(6-5) Control of Refrigeration Cycle Apparatus 1

The refrigeration cycle apparatus 1 according to the third embodiment includes a controller 90 (see FIG. 11) to cause internal devices to implement the operation described above. A CPU 91 and memory 92 are included as a processor and a storage unit, respectively, in the controller 90 according to the third embodiment, as in the controller 90 according to the first embodiment.

The difference between the controller 90 according to the first embodiment and the controller 90 according to the third embodiment is in the control of the switching mechanism 40. The following describes the way the controller 90 controls the switching mechanism 40. The controller 90 according to the third embodiment controls the four-way valve 48 such that switching of the switching mechanism 40 is controlled. The motor 48m provided to the four-way valve 48 may be a stepping motor capable of adjusting the angle of rotation in accordance with a signal from the controller 90. Signals of different frequencies may be used such that the rotational speed of the stepping motor provided as the motor 48m may be changed in accordance with the frequency of the signal input to the motor 48m. A different approach may be adopted to change the rotational speed of the motor 48m. For example, gears for transmitting rotation of the motor 48m may be disposed, in which case the rotational speed can be changed in accordance with the gear ratio.

For example, the refrigeration cycle apparatus 1 is configured such that the rotational speed decreases when there is a significant difference between the pressure of refrigerant in the first heat exchanger 20 and the pressure of refrigerant in the second heat exchangers 30. This feature of the refrigeration cycle apparatus 1 offers the following advantage: the lower the rotational speed is, the longer the duration of the third connection state is. Conversely, the refrigeration cycle apparatus 1 is configured such that the rotational speed increases when there is a little difference between the pressure of refrigerant in the first heat exchanger 20 and the pressure of refrigerant in the second heat exchangers 30. This feature of the refrigeration cycle apparatus 1 offers the following advantage: the higher the rotational speed is, the shorter the time it takes to enable switching between the first connection state and the second connection state is.

In the first connection state, the controller 90 sets the four-way valve 48 into the state illustrated in FIG. 8, in which the first port 41 communicates with the second port 42, and the third port 43 communicates with the fourth port 44. When a transition from the first connection state to the third connection state takes place, the controller 90 controls the motor 48m in such a manner that the valve element 48v of the four-way valve 48 rotates 45 degrees (see FIG. 9). When a transition from the third connection state to the second connection state takes place, the controller 90 causes the valve element 48v of the four-way valve 48 to rotate 45 degrees, where a 90-degree turn relative to the valve element 48v in the first connection state is made. The switching mechanism 40 is thus brought into the state illustrated in FIG. 10, in which the first port 41 communicates with the fourth port 44, and the third port 43 communicates with the second port 42.

In the second connection state, the controller 90 sets the four-way valve 48 into the state illustrated in FIG. 10. When a transition from the second connection state to the third connection state takes place, the controller 90 controls the motor 48m in such a manner that the valve element 48v of the four-way valve 48 rotates 45 degrees (see FIG. 9). When a transition from the third connection state to the first connection state takes place, the controller 90 causes the valve element 48v of the four-way valve 48 to rotate 45 degrees, where a 90-degree turn relative to the valve element 48v in the second connection state is made. The switching mechanism 40 is thus brought into the state illustrated in FIG. 8, in which the first port 41 communicates with the second port 42, and the third port 43 communicates with the fourth port 44.

The valve element 48v described above rotates counterclockwise to effect a transition from the first connection state to the second connection state and rotates clockwise to effect a transition from the second connection state to the first connection state. It is not required that the rotation of the valve element 48v be controlled in the manner mentioned above. In some embodiments, the valve element 48v under the control of the controller 90 rotates clockwise to effect a transition from the first connection state to the second connection state and rotates clockwise to effect a transition from the second connection state to the first connection state.

(7) Modifications (7-1) Modifications 1A, 2A, and 3A

The refrigeration cycle apparatus 1 according to each of the first, second, and third embodiments described above uses carbon dioxide as refrigerant and is configured such that refrigerant in a supercritical state is discharged from the compressor 10. It is not required that refrigerant brought into a supercritical state in the refrigeration cycle apparatus 1 be carbon dioxide. The refrigerant to be used in the refrigeration cycle apparatus 1 may be a fluorocarbon refrigerant. The refrigeration cycle apparatus 1 may use R23 as refrigerant and may be configured such that refrigerant in a supercritical state is discharged from the compressor 10.

(7-2) Modifications 1B, 2B, and 3B

The refrigeration cycle apparatus 1 according to each of the first, second, and third embodiments described above is configured such that refrigerant in a supercritical state is discharged from the compressor 10. It is not required that refrigerant in a supercritical state be discharged from the compressor 10, and the refrigeration cycle apparatus 1 may be configured such that refrigerant in gaseous form is discharged from the compressor 10.

(8) Features (8-1)

As described above, the refrigeration cycle apparatus 1 goes through the third connection state while the switching mechanism 40 of the refrigeration cycle apparatus 1 performs switching between the first connection state and the second connection state of the refrigeration cycle apparatus 1. In the third connection state, the first channel F1 provides intercommunication between the first heat exchanger 20 and the second heat exchangers 30. The refrigeration cycle apparatus 1 is configured such that the difference between the pressure of refrigerant in the first heat exchanger 20 and the pressure of refrigerant in the second heat exchangers 30 is reduced at the time of switching between the first connection state and the second connection state. This eliminates or reduces the possibility that refrigerant under high pressure in the first heat exchanger 20 or the second heat exchangers 30 will flow out in large quantity into a low-pressure site such as the receiver 11 or the intake side (located upstream of the inlet) of the compressor 10 at the time of switching of the switching mechanism 40.

(8-2)

The switching mechanism 40 of the refrigeration cycle apparatus 1 changes the intercommunication between four ports (the first port 41, the second port 42, the third port 43, and the fourth port 44) to enable switching among the first connection state, the second connection state, and the third connection state. In the third connection state, refrigerant is allowed to flow through the second port 42 and the fourth port 44 such that the refrigerant can flow into and out of the first heat exchanger 20 and the second heat exchangers 30. The refrigerant in the first heat exchanger 20 or the refrigerant in the second heat exchangers 30 is decompressed due to a transition to the third connection state. This eliminates or reduces the possibility that refrigerant in the first heat exchanger 20 or the second heat exchangers 30 will flow out in large quantity into a low-pressure site.

(8-3)

When the refrigeration cycle apparatus 1 according to the first embodiment or the second embodiment is in the third connection state, refrigerant is allowed to flow through the first bypass pipe P1 and the first on-off valve 51, that is, through the first channel F1 such that the refrigerant can flow into and out of the first heat exchanger 20 and the second heat exchangers 30. The high-pressure refrigerant in the first heat exchanger 20 and the high-pressure refrigerant in the second heat exchangers 30 are decompressed accordingly. This eliminates or reduces the possibility that a large quantity of refrigerant will flow out of the first heat exchanger 20 and into a low-pressure site such as the receiver 11 or the intake side of the compressor 10 when a transition to the second connection state is completed. This also eliminates or reduces the possibility that a large quantity of refrigerant will flow out of the second heat exchangers 30 and into the receiver 11 or the intake side of the compressor 10 when a transition to the first connection state is completed. The first embodiment and the second embodiment each adopt such a simple configuration or, more specifically, the first bypass pipe P1 and the first on-off valve 51 to eliminate or reduce the possibility that a large quantity of refrigerant will flow into the receiver 11 or the intake side of the compressor 10 at the time of switching between the first connection state and the second connection state.

(8-4)

While the switching mechanism 40 performs switching between the first connection state and the second connection state, the refrigeration cycle apparatus 1 according the first embodiment or the second embodiment is brought into the third connection state, in which the second channel F2 provides interconnection between the intake side (located upstream of the inlet) of the compressor 10 and the discharge side (located downstream of the outlet) of the compressor 10. Consequently, refrigerant on the discharge side of the compressor 10 is decompressed. In this way, the refrigeration cycle apparatus 1 addresses problems associated with a flow of refrigerant from the discharge side of the compressor 10 to a low-pressure site at the time of switching between the first connection state and the second connection state. The effect of reducing noise (impulsive sound) is an advantage of reducing the flow of refrigerant from the discharge side of the compressor 10 to a low-pressure.

(8-5)

When the refrigeration cycle apparatus 1 according to the first embodiment or the second embodiment is in the third connection state, refrigerant is allowed to flow through the second bypass pipe P2 and the second on-off valve 52, that is, through the second channel F2 such that the refrigerant can flow from the discharge side of the compressor 10 and into the intake side of the compressor 10. The pressure on the discharge side of the compressor 10 is reduced accordingly. This eliminates or reduces the possibility that an upsurge in the flow of refrigerant from the discharge side of the compressor 10 to a low-pressure site will occur when a transition to the first connection state or to the second connection state is completed. The first embodiment and the second embodiment each adopt such a simple configuration or, more specifically, the second bypass pipe P2 and the second on-off valve 52 to reduce the flow of refrigerant from the discharge side of the compressor 10 when a switching between the first connection state and the second connection state is performed.

(8-6)

When the refrigeration cycle apparatus 1 according to the third embodiment is in the third connection state, refrigerant is allowed to flow through the first bypass channel 48c, that is, the first channel F1 such that the refrigerant can flow into and out of the first heat exchanger 20 and the second heat exchangers 30. The high-pressure refrigerant in the first heat exchanger 20 and the high-pressure refrigerant in the second heat exchangers 30 are decompressed accordingly. This eliminates or reduces the possibility that a large quantity of refrigerant will flow out of the first heat exchanger 20 and into a low-pressure site such as the receiver 11 or the intake side of the compressor 10 when a transition to the second connection state is completed. This also eliminates or reduces the possibility that a large quantity of refrigerant will flow out of the second heat exchangers 30 and into the receiver 11 or the intake side of the compressor 10 when a transition to the first connection state is completed. The third embodiment adopts such a simple configuration or, more specifically, the first bypass channel 48c to eliminate or reduce the possibility that a large quantity of refrigerant will flow into the receiver 11 or the intake side of the compressor 10 at the time of switching between the first connection state and the second connection state.

(8-7)

When the refrigeration cycle apparatus 1 according to the third embodiment is in the third connection state, refrigerant is allowed to flow through the second bypass channel 48d, that is, the second channel F2 such that the refrigerant can flow from the discharge side of the compressor 10 and into the intake side of the compressor 10. The pressure on the discharge side of the compressor 10 is reduced accordingly. This eliminates or reduces the possibility that an upsurge in the flow of refrigerant from the discharge side of the compressor 10 to a low-pressure site will occur when a transition to the first connection state or to the second connection state is completed. The third embodiment adopts such a simple configuration or, more specifically, the second bypass channel 48d to reduce the flow of refrigerant from the discharge side of the compressor 10 when a switching between the first connection state and the second connection state is performed.

(8-8)

The refrigeration cycle apparatus 1 according to the third embodiment is configured such that the Cv value of the first bypass channel 48c is greater than the Cv value of the second bypass channel 48d. It is thus ensured that the time it takes to reduce the difference in the pressure of refrigerant in the first heat exchanger 20 and the pressure of refrigerant in the second heat exchangers 30 will not be much longer than the time it takes to reduce the pressure difference between the discharge side and the intake side of the compressor 10. In other words, it is ensured that the time required to eliminate or reduce the pressure difference through the use of the first bypass channel 48c will not be much longer than the time required to eliminate or reduce the pressure difference through the use of the second bypass channel 48d. The duration of the third connection state will be shorter than if the Cv value of the first bypass channel 48c is equal to the Cv value of the second bypass channel 48d.

The refrigeration cycle apparatus 1 according to the first embodiment and the refrigeration cycle apparatus 1 according to the second embodiment may be configured such that the Cv value of the first channel F1 is greater than the Cv value of the second channel F2. Effects equivalent to those produced by the refrigeration cycle apparatus 1 according to the third embodiment may be achieved accordingly.

(8-9)

The switching mechanism 40 of the refrigeration cycle apparatus 1 according to the third embodiment may be a rotary valve designed such that the rotational speed of the valve element 48v is changeable. For example, the refrigeration cycle apparatus 1 is configured such that the rotational speed decreases when there is a significant difference between the pressure of refrigerant in the first heat exchanger 20 and the pressure of refrigerant in the second heat exchangers 30. The lower the rotational speed is, the longer the duration of the third connection state is. When being configured such that the rotational speed is changed in accordance with the pressure difference, the refrigeration cycle apparatus 1 can operate in a manner so as to eliminate or reduce the pressure difference to a satisfactory degree no matter how large the pressure difference is. A pressure sensor may be disposed on the discharge side of the compressor 10 to measure the pressure of refrigerant in the first heat exchanger 20 or the pressure of refrigerant in each second heat exchanger 30, whichever is higher. The controller 90 may be configured to acquire the measurements such that the rotational speed of the switching mechanism 40 is able to be changed in accordance with the pressure of refrigerant in the first heat exchanger 20 or the pressure of refrigerant in each second heat exchanger 30, whichever is higher.

(8-10)

When the four-way valve 48 according to the third embodiment in the third connection state illustrated in FIG. 9, the second port 42 communicates with the fourth port 44 through the first bypass channel 48c. This enables a reduction in the difference between the pressure of refrigerant in a portion being part of the refrigerant circuit and connected to the second port 42 and the pressure of refrigerant in a portion being part of the refrigerant circuit and connected to the fourth port 44. Such a simple configuration or, more specifically, the first bypass channel 48c of the four-way valve 48 is conducive to reducing the flow of refrigerant from the relevant portion of the refrigerant circuit (the portion connected to the second port 42 or the portion connected to the fourth port 44) to a low-pressure site.

(8-11)

When the four-way valve 48 according to the third embodiment in the third connection state illustrated in FIG. 9, the first port 41 communicates with the third port 43 through the second bypass channel 48d. This enables a reduction in the difference between the pressure of refrigerant in a portion being part of the refrigerant circuit and connected to the first port 41 and the pressure of refrigerant in a portion being part of the refrigerant circuit and connected to the third port 43. Such a simple configuration or, more specifically, the second bypass channel 48c of the four-way valve 48 is conducive to reducing the flow of refrigerant from the relevant portion of the refrigerant circuit (the portion connected to the first port 41 or the portion connected to the third port 43) to a low-pressure site.

(8-12)

The four-way valve 48 according to the third embodiment is configured such that the Cv value of the first bypass channel 48c is greater than the Cv value of the second bypass channel 48d. It can be prevent that the time required to eliminate or reduce the pressure difference through the use of the first bypass channel 48c will not be much longer than the time required to eliminate or reduce the pressure difference through the use of the second bypass channel 48d. Consequently, the duration of the third connection state will be shorter than if the Cv value of the first bypass channel 48c is equal to the Cv value of the second bypass channel 48d.

While the embodiments of the present disclosure have been described herein above, it is to be appreciated that various changes in form and detail may be made without departing from the spirit and scope of the present disclosure presently or hereafter claimed.

EXPLANATION OF REFERENCES 1 refrigeration cycle apparatus
10 compressor
20 first heat exchanger
30 second heat exchanger
40 switching mechanism
41 first port
42 second port
43 third port
44 fourth port
48 four-way valve
48c first bypass channel
48d second bypass channel
51 first on-off valve
52 second on-off valve F1 first channel
F2 second channel
P1 first bypass pipe
P2 second bypass pipe

CITATION LIST

Patent Literature

PTL 1: Japanese Unexamined Patent Application Publication No. 2018-123972

The invention claimed is:

1. A refrigeration cycle apparatus, comprising:
a compressor that sucks in refrigerant, compresses the refrigerant, and then discharges the refrigerant;
a first heat exchanger that functions as a radiator in a first cycle and functions as an evaporator in a second cycle;
a second heat exchanger that functions as an evaporator in the first cycle and functions as a radiator in the second cycle; and
a switching mechanism including a first channel and performing switching among a first connection state, a second connection state, and a third connection state, wherein
in the first connection state, the refrigeration cycle apparatus repeatedly performs the first cycle in which refrigerant flows through the compressor, the first heat exchanger, the second heat exchanger, and the compressor in that order,
in the second connection state, the refrigeration cycle apparatus repeatedly performs the second cycle in which refrigerant flows through the compressor, the second heat exchanger, the first heat exchanger, and the compressor in that order,
in the third connection state, a passage between the compressor and the first heat exchanger and a passage between the compressor and the second heat exchanger are closed, and the first channel in the refrigeration cycle apparatus provides interconnection between the first heat exchanger and the second heat exchanger, and
wherein during switching between the first connection state and the second connection state, the refrigeration cycle apparatus is configured to switch to the third connection state.

2. The refrigeration cycle apparatus according to claim 1, wherein
the switching mechanism includes a first port, a second port, a third port, and a fourth port,
the first port is where refrigerant compressed by the compressor flows in,
the second port communicates with the first heat exchanger,
the third port is where the refrigerant that is to be sucked into the compressor flows out,
the fourth port communicates with the second heat exchanger,
in the first connection state, the first port communicates with the second port, and the third port communicates with the fourth port,
in the second connection state, the first port communicates with the fourth port, and the second port communicates with the third port, and
in the third connection state, the second port communicates with the fourth port.

3. A refrigeration cycle apparatus, comprising:
a compressor that sucks in refrigerant, compresses the refrigerant, and then discharges the refrigerant;
a first heat exchanger that functions as a radiator in a first cycle and functions as an evaporator in a second cycle;
a second heat exchanger that functions as an evaporator in the first cycle and functions as a radiator in the second cycle; and
a switching mechanism including a first channel and performing switching among a first connection state, a second connection state, and a third connection state, wherein
in the first connection state, the refrigeration cycle apparatus repeatedly performs the first cycle in which refrigerant flows through the compressor, the first heat exchanger, the second heat exchanger, and the compressor in that order,
in the second connection state, the refrigeration cycle apparatus repeatedly performs the second cycle in which refrigerant flows through the compressor, the second heat exchanger, the first heat exchanger, and the compressor in that order,
in the third connection state, a passage between the compressor and the first heat exchanger and a passage between the compressor and the second heat exchanger are closed, and the first channel in the refrigeration cycle apparatus provides interconnection between the first heat exchanger and the second heat exchanger,
the switching mechanism includes a first port, a second port, a third port, and a fourth port,
the first port is where refrigerant compressed by the compressor flows in,
the second port communicates with the first heat exchanger,
the third port is where the refrigerant that is to be sucked into the compressor flows out,
the fourth port communicates with the second heat exchanger,
in the first connection state, the first port communicates with the second port, and the third port communicates with the fourth port,
in the second connection state, the first port communicates with the fourth port, and the second port communicates with the third port,
in the third connection state, the second port communicates with the fourth port
the first channel includes
a first bypass pipe through which the second port communicates with the fourth port, and
a first on-off valve provided to the first bypass pipe to enable switching between opening and closing of the first bypass pipe,
in the first connection state and the second connection state, the first on-off valve closes the first bypass pipe of the first channel, and
in the third connection state, the first on-off valve opens the first bypass pipe of the first channel.

4. The refrigeration cycle apparatus according to claim 2, further comprising a second channel through which the first port communicates with the third port in the third connection state.

5. A refrigeration cycle apparatus, comprising:
a compressor that sucks in refrigerant, compresses the refrigerant, and then discharges the refrigerant;
a first heat exchanger that functions as a radiator in a first cycle and functions as an evaporator in a second cycle;
a second heat exchanger that functions as an evaporator in the first cycle and functions as a radiator in the second cycle; and a switching mechanism including a first channel and performing switching among a first connection state, a second connection state, and a third connection state, wherein in the first connection state, the refrigeration cycle apparatus repeatedly performs the first cycle in which refrigerant flows through the compressor, the first heat exchanger, the second heat exchanger, and the compressor in that order, in the second connection state, the refrigeration cycle apparatus repeatedly performs the second cycle in which refrigerant flows through the compressor, the second heat exchanger, the first heat exchanger, and the compressor in that order, in the third connection state, a passage between the compressor and the first heat exchanger and a passage between the compressor and the second heat exchanger are closed, and the first channel in the refrigeration cycle apparatus provides interconnection between the first heat exchanger and the second heat exchanger, the switching mechanism includes a first port, a second port, a third port, and a fourth port, the first port is where refrigerant compressed by the compressor flows in, the second port communicates with the first heat exchanger, the third port is where the refrigerant that is to be sucked into the compressor flows out, the fourth port communicates with the second heat exchanger, in the first connection state, the first port communicates with the second port, and the third port communicates with the fourth port, in the second connection state, the first port communicates with the fourth port, and the second port communicates with the third port, in the third connection state, the second port communicates with the fourth port, the refrigerant cycle apparatus further comprising further comprising a second channel through which the first port communicates with the third port in the third connection state the second channel includes
  a second bypass pipe through which the first port communicates with the third port, and
  a second on-off valve provided to the second bypass pipe to enable switching between opening and closing of the second bypass pipe, in the first connection state and the second connection state, the second on-off valve closes the second bypass pipe of the second channel, and in the third connection state, the second on-off valve opens the second bypass pipe of the second channel.

6. The refrigeration cycle apparatus according to claim 2, wherein the switching mechanism includes a first bypass channel that is the first channel, in the third connection state, the second port communicates with the fourth port through the first bypass channel, and in the first connection state and the second connection state, the switching mechanism closes the first bypass channel.

7. The refrigeration cycle apparatus according to claim 6, wherein the switching mechanism includes a second bypass channel, in the third connection state, the first port communicates with the third port through the second bypass channel, and in the first connection state and the second connection state, the switching mechanism closes the second bypass channel.

8. The refrigeration cycle apparatus according to claim 7, wherein a flow path cross-sectional value of the first bypass channel is greater than a flow path cross-sectional value of the second bypass channel.

9. The refrigeration cycle apparatus according to claim 6, wherein the switching mechanism is a rotary valve whose rotational speed is changeable.

10. The refrigeration cycle apparatus according to claim 1, wherein the switching mechanism includes a four-way valve, comprising:
  a first port;
  a second port;
  a third port;
  a fourth port; and
  a first bypass channel,
  wherein
    in the first connection state,
      the first port communicates with the second port, and
      the third port communicates with the fourth port, and
      the four-way valve closes the first bypass channel, and
    in the second connection state,
      the first port communicates with the fourth port, and
      the second port communicates with the third port, and
      the four-way valve closes the first bypass channel, and
    in the third connection state, the second port communicates with the fourth port through the first bypass channel.

11. The refrigerant cycle apparatus according to claim 10, wherein the four-way valve further comprising a second bypass channel, wherein
  in the first connection state,
    the first port communicates with the second port, and
    the third port communicates with the fourth port, and
    the four-way valve closes the first bypass channel and the second bypass channel,
  in the second connection state,
    the first port communicates with the fourth port, and the second port communicates with the third port, and
    the four-way valve closes the first bypass channel and the second bypass channel,
  in the third connection state,
    the second port communicates with the fourth port through the first bypass channel, and
    the first port communicates with the third port through the second bypass channel.

12. The refrigeration cycle apparatus according to claim 11, wherein a flow path cross-sectional value of the first bypass channel is greater than a low path cross-sectional value of the second bypass channel.

13. The refrigeration cycle apparatus according to claim 7, wherein the switching mechanism is a rotary valve whose rotational speed is changeable.

14. The refrigeration cycle apparatus according to claim 8, wherein the switching mechanism includes a rotary valve whose rotational speed is changeable.

15. The refrigeration cycle apparatus according to claim 1, wherein in the first connection state and in the second connection state the first channel does not provide communication between the first heat exchanger and the second heat exchanger.

16. The refrigeration cycle apparatus according to claim 10, wherein the first bypass channel includes a first on-off valve.

17. The refrigeration cycle apparatus according to claim 16, wherein
in the first connection state, the first on-off valve closes the first bypass channel,
in the second connection state the first on-off valve closes the first bypass channel, and
in the third connection state the first on-off valve opens the first bypass channel.

18. The refrigeration cycle apparatus according to claim 2, further comprising:
a first bypass pipe through which the second port communicates with the fourth port.

19. The refrigeration cycle apparatus according to claim 18, further comprising:
a second bypass pipe through which the first port communicates with the third port.

20. The refrigeration cycle apparatus according to claim 19, further comprising:
a first on-off valve provided to the first bypass pipe to enable switching between opening and closing of the first bypass pipe; and
a second on-off valve provided to the second bypass pipe to enable switching between opening and closing of the second bypass pipe.

* * * * *